Nov. 15, 1960 D. L. CURTIS 2,960,690
COMPUTER INPUT-OUTPUT SYSTEM
Filed Nov. 26, 1956
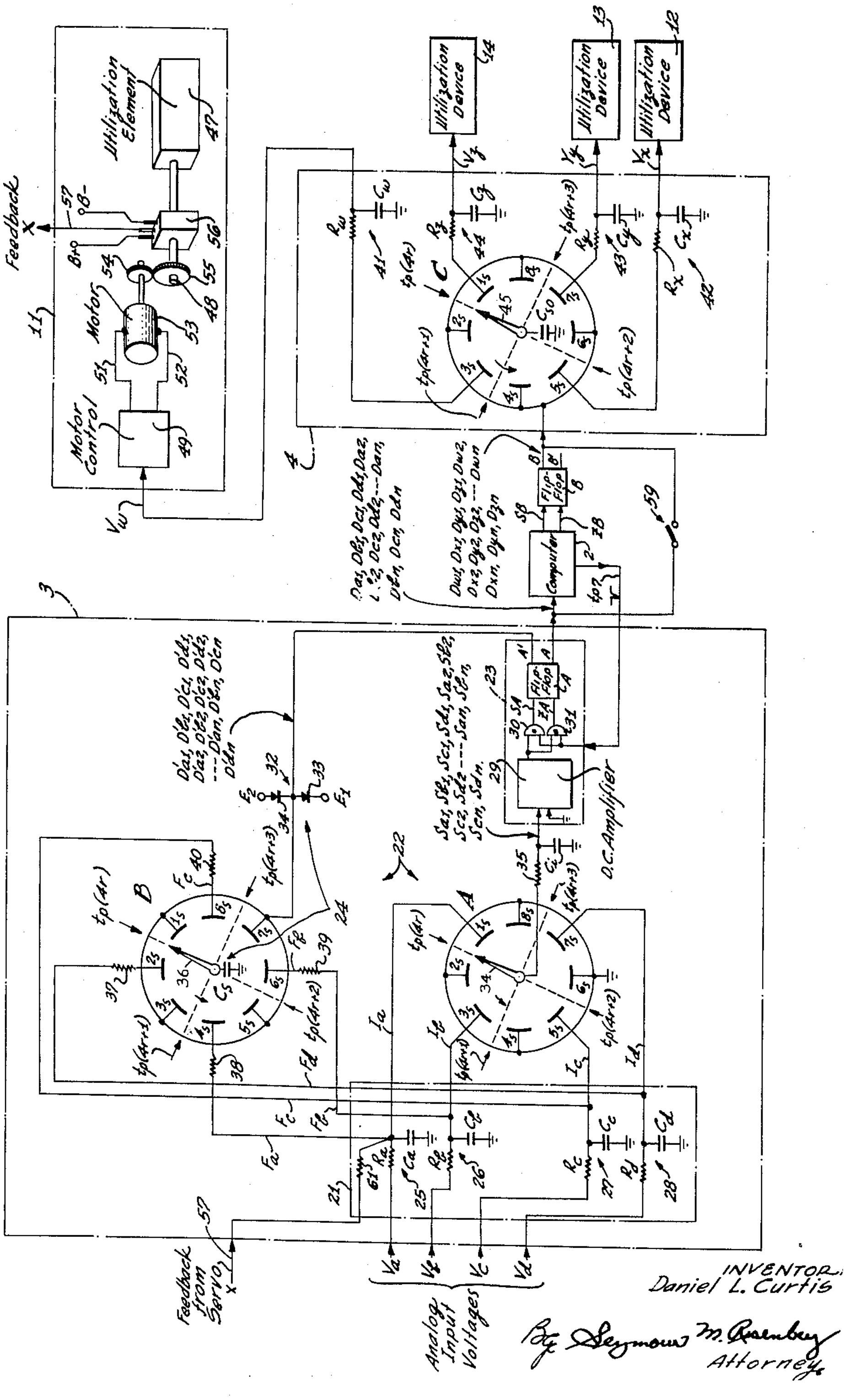
INVENTOR.
Daniel L. Curtis
By Seymour M. Rosenberg
Attorney 2,960,690

Patented Nov. 15, 1960

2,960,690

COMPUTER INPUT-OUTPUT SYSTEM

Daniel L. Curtis, Manhattan Beach, Calif., assignor to Litton Industries of California, Beverly Hills, Calif.

Filed Nov. 26, 1956, Ser. No. 624,297

30 Claims. (Cl. 340—347)

This invention relates to computer input-output systems and more particularly to a multiple-input multiple-output system for converting a plurality of analog input voltages to a corresponding plurality of interplexed difunction signal trains for application to a digital computer, and for converting a plurality of interplexed difunction signal trains developed by the computer into a corresponding plurality of separate analog output voltages.

As used herein the term "difunction signal train," refers to a train of signals, each signal of which has either a first value representing a first number or a second value representing a second number, the value of the difunction signal train being equal to the average value of the signals of the train. In contrast to a binary or binary-coded signal train wherein each signal of the train has a weight or significance dependent upon its position in the train, each equal-valued signal of a difunction signal train has equal significance wherever it may appear in the train.

Some examples of the extremely useful application of difunction signal trains in the solution of mathematical operations and in the field of automatic controls are described and illustrated in copending U.S. patent application Serial No. 388,780, for "Electronic Digital Differential Analyzer" by Floyd G. Steele, filed October 28, 1953, wherein there is described a digital differential analyzer employing difunction signal trains for communicating between the integrators contained therein. Similarly, the U.S. Patent No. 2,898,040, entitled "Computer and Indicator System," to Floyd G. Steele, issued August 4, 1959, discloses the application of difunction representation to the field of process control and also discloses electronic computing circuits which operate directly to perform mathematical operations by combining difunction signals.

In order to fully exploit the potential of difunction computing techniques, especially as applied to the field of process control and to the solution of real time problems, there is a need for input-conversion devices which can transform applied analog signals to equivalent difunction signal trains, and for output-conversion devices for converting output difunction signal trains to corresponding separate analog output voltages. Ordinarily, what is desired of input-conversion devices is that they produce a difunction signal train for each applied analog voltage, each difunction signal train having an average value proportional to the average value of the analog voltage. Similarly, it is desired that output-conversion devices be operable to produce an analog voltage for each difunction signal train applied thereto, the analog voltage having a value proportional to the average value of the difunction signal train.

An analog-to-difunction converter for converting a signal applied analog voltage signal to an equivalent difunction signal train is described and illustrated in the U.S. Patent No. 2,885,662, entitled "Analog-to-Difunction Converter" to Siegfried Hansen, issued May 5, 1959. As is fully explained in the Hansen patent, the integral with respect to time of an analog signal over a given time interval is proportional to the algebraic summation of the signal values of an equivalent difunction signal train over the same time interval. Accordingly, the accuracy with which a given difunction signal train represents a corresponding analog signal may be readily determined by directly comparing the algebraic summation of the difunction signals with the integral of the analog signal over the same time interval. From the above comparison, the nature of the difunction signal that should be generated and added to the terminal end of the difunction signal train in order to cause the average value of the resultant signal train to more nearly approach the average value of the analog signal may be determined. By continually expanding the difunction train in the above manner, the average value of the difunction train approaches the average value of the analog signal.

As described in the Hansen patent, an analog-to-difunction converter mechanized in accordance with the above concepts, may comprise an integrator, a standard signal source, and a comparator or sensing element. In one form of a difunction converter, the integrator includes an integrating capacitor which is charged at a rate and in a sense corresponding to the magnitude and polarity of the applied analog voltage. A standard unit charge is developed by the standard signal source for each difunction signal generated which represents the sign-magnitude value of the difunction signal. The standard unit charges so developed are fed-back to the integrating capacitor in such a manner as to subtract from the integral of the analog signal. The resultant integral thus developed across the integrating capacitor, therefore, continuously represents the difference between the integral with respect to time of the applied analog signal and the algebraic summation of the difunction signals generated over the same time interval.

This resultant integral is impressed on the sensing element which is operative to sample the resultant integral during each difunction signal period for generating a first-valued difunction output signal if the resultant integral exceeds a predetermined reference value and to generate a second-valued difunction output signal if the resultant integral is less than the predetermined reference value. The sensing element, as described in the Hansen patent may include a stabilized amplifier for amplifying the resultant integral, a comparator circuit for comparing the amplified integral with a reference voltage at the end of each difunction signal period, and a difunction signal generator for generating a difunction signal during each difunction signal period in accordance with the result of the above comparison.

The standard signal source is coupled to the comparator circuit and is operative to feedback to the integrator either a first or second standard quantity during each difunction signal period in accordance with the results of each comparison. In the form of standard signal generator which is adapted for use in connection with a comparator type of integrator, a standard charge is made available during each difunction signal period by applying a standard voltage to a standard capacitor during the preceding difunction signal period. By selecting a relatively small capacitance for the standard capacitor, the capacitor becomes fully charged to the limit established by the amplitude of the applied standard voltage during a fraction of a difunction signal period. In this way a standard charge becomes available during each difunction signal period which may be fed back to the integrating capacitor at the end of the difunction signal period.

The application of a converter of the Hansen patent for conversion of a single analog signal to a corresponding equivalent difunction signal train is apparent. In many applications of difunction computing techniques, however, there is a need for a multiple-input analog-to-difunction conversion device to simultaneously convert a plurality of applied analog signals to a corresponding plurality of equivalent difunction signal trains. Two logical methods suggest themselves for utilizing Hansen converters to obtain a multiple-input conversion device of the above class. The first and obvious method is to incorporate a separate converter for each of the applied analog signals, each converter being employed to convert a corresponding one of the applied analog signals to an equivalent difunction signal train. This method, although certainly operable, has the obvious disadvantage of resulting in a multiple-input device of relatively large bulk and electronic complexity, a disadvantage which may become acute where a relatively large number of applied analog signals are involved.

A second and more refined approach to the problem is to seek some way in which a single analog-to-difunction converter may be employed, on a time-sharing basis for the conversion of a plurality of analog input signals. It might be thought that such an object could be accomplished by successively commutating each of the analog signals individually and successively to a converter for sufficiently long time intervals to generate, in a sequential manner one or several difunction signals of each equivalent difunction signal train during each cycle of commutation. When time-sharing a converter in this manner for the conversion of a plurality of analog signals the resultant equivalent difunction signal trains would be interplexed, i.e. the signals of each difunction signal train being interplexed in time among the difunction signals of the other difunction signal trains.

Several serious disadvantages would be encountered in time-shared operation of a converter. It will be appreciated that in such operation, it would be necessary that the ordinarily low level analog input signals be commutated to the input of a converter for fixed or at least reproducible predetermined time intervals and with no or at least unvarying diminution of signal amplitude. However, as is well known in the art, both the impedance and the duration of conductance paths established through a conventional commutator (an ordinary brush-segment commutator for example) vary unpredictably from cycle-to-cycle of commutation because of the compounded effects of contact bounce, contact sparking, lowering of insulation resistance through pollution by conductive contact debris, and other well-known deleterious effects. As a result in ordinary operation both the duration and amplitude of commutated analog signals vary albeit slightly but unpredictably from cycle-to-cycle of commutation. The accurate (better than 1% accuracy) commutation of low level analog signals is one of the most serious problems of the electronic computing and switching arts. It will be shown that in accordance with the novel teachings of the present invention such commutation of signals may be accomplished relatively independent of and unaffected by the expected variations in duration and impedance of conductive paths established through a commutator.

Moreover as described hereinbelow in further application of the principles of the present invention, a multiple-output device for converting a plurality of interplexed difunction output signal trains developed by a computer to a corresponding plurality of separate analog output signals (for the operation of associated indicator and control utilization equipment) is shown in which successively produced interplexed difunction signals are accurately commutated to separate outputs to produce corresponding signals. In accordance with the invention, unique commutating techniques are utilized in both the multiple-input and multiple-output converters of the present invention.

In accordance with the basic concepts of the present invention, a multiple-input converter is provided by separately integrating each signal of a plurality of applied analog signals to produce a corresponding plurality of integrals, cyclically scanning each of the plurality of integrals to cyclically produce a series of corresponding sampling signals, each sampling signal being produced during a predetermined difunction signal interval, and generating a difunction output signal during each difunction signal interval having a first value if the sampling signal produced during the signal interval exceeds a predetermined reference level and having a second value if the sampling signal produced during the signal interval is less than the reference level. As each difunction output signal is generated, a first or second standard quantity representative of the value of the difunction signal is subtracted from the corresponding integral scanned to produce the difunction signal. In this manner, the magnitude of each of the plurality of integrals continuously represents the difference between the average value of a corresponding one of the applied analog signals and the average value of the previously generated signals of the corresponding difunction signal train.

As described hereinbelow, one embodiment of a multiple-input converter mechanized in accordance with the present invention comprises an integrating circuit, an input commutator having a first and a second section, a sensing element, and a standard signal source. The integrating circuit includes a number of separate integrators responsive to a plurality of applied analog signals for producing a corresponding plurality of integral signals representing the integral with respect to time of the respective analog signals. Each integrator includes an integrating capacitor which is charged at a rate and in a sense corresponding to the magnitude and polarity of the corresponding analog signal applied thereto to thus develop a corresponding integral signal across the integrating capacitor.

The plurality of integral signals thus produced are impressed on a first section of an input commutator which is operable to cyclically scan each of the integral signals to produce the series of sampling signals which are in turn impressed on a sensing element. This sensing element, similar to the sensing element previously referred to and fully described in the Hansen patent, is operable for comparing each sampling signal with a predetermined reference level and for generating a difunction output signal during each difunction signal interval having a first value if the sampling signal exceeds the predetermined reference level, and a second value if the sampling signal is less than the predetermined reference level. A complementary difunction signal (a signal having the same magnitude but opposite sense to the generated difunction signal) is also produced by the sensing element.

The standard signal source operates in accordance with principles similar to that previously described with reference to the Hansen patent in that a unit quantity corresponding to the value of each difunction signal generated may be obtained during each difunction signal period by applying a standard voltage to a standard capacitor during the preceding difunction signal period. This is accomplished in accordance with the present invention by first stabilizing the amplitudes of the difunction-complement signals to obtain a standard voltage during each difunction signal interval having a value corresponding to the opposite sign-value of the difunction signal generated during the signal interval. The standard voltage so obtained is applied to a standard capacitor to obtain during each difunction signal interval, a standard unit charge which may be added, i.e. literally "dumped" back into the corresponding integrating capacitor through a conductive path established at the proper time by a second section of the input commutator. The resultant integral signal developed across each of the integrating capacitors will, therefore, represent at all times the difference between the average value of the corresponding applied analog signal and the corresponding difunction signals generated.

Representing a marked improvement over commutation techniqnes of the prior art, in the multiple-input converter of the present invention successive integral signals are applied to the sensing element and corresponding charge quantities are fed-back the standard signal source to the corresponding integrators by means of a novel commutating system wherein low level signals may be accurately transferred through a commutator independent of variations in impedance or duration of conductive paths established through the commutator. In accordance with the concepts of the invention, a conventional commutator of the prior art, such as a brush-segment, commutator previously discussed, may be utilized to reliably commutate an input signal from an input point to an output point by first charging an input capacitor to a charge representative of the magnitude and sense of the input signal, and then connecting the charged input capacitor to an output capacitor by means of the commutator for sufficient time to establish charge-equilibrium between the input and output capacitors. Once charge-equilibrium is established, no current flows through the commutator between the two capacitors and the final voltage established by the two capacitors is determined purely by their initial charges and the relative size of the two capacitors. In this manner an output voltage signal is developed across the output capacitor which accurately and reliably represents the magnitude and sense of the input signal applied to the input capacitor, the magnitude and sense of the output signal being completely independent of the nature and magnitude of the impedance of the conductive path established through the commutator.

In applying the above concepts to the multiple-input converter of the present invention, the first section of the input commutator is employed to successively and cyclically connect a sampling capacitor to each of the integrating capacitors of the plurality of integrators, thereby successively and cyclically developing corresponding sampling signals across the sampling capacitor, these successive sampling signals being applied to the sensing element.

The sampling capacitor is connected to each integrator for a sufficiently long interval to allow charge-equilibrium to be established between the sampling capacitor and the corresponding integrator capacitor. Thus the accuracy of the successive sampling signals produced will be independent of any varying impedance through the input commutator.

The successive difunction signals produced by the sensing element (in response to the corresponding sampling signals) are each stabilized in value and applied to charge a standard capacitor to a corresponding standard charge. Each successive standard charge is in turn fed-back from the standard capacitor to the corresponding integrator capacitor by means of the second section of the input commutator. As in the first section of the input commutator, successive connections made through the commutator between the standard capacitor and each integrator capacitor are maintained for sufficiently long time intervals to allow charge-equilibrium to be established, thereby assuring the accurate transfer to the feedback charges. Thus it is seen that through application of the described commutation principle, in the input converter of the present invention, integral signals are accurately commutated from the integrator capacitors to the sampling capacitor and resultant standard charges formed in the standard capacitor are accurately commutated back from the standard capacitor to the corresponding integrator capacitors.

As described herein, the plurality of difunction input signal trains produced by the input converter of the present invention may be applied to an electronic computer or other switching device which operates to combine the difunction input signal trains to produce resultant interplexed difunction output signal trains. In accordance with the invention a multiple-output converter is provided for receiving such interplexed difunction signal trains and producing a corresponding plurality of analog output signals, each analog output signal representing the value of the corresponding difunction signal train.

In application of the above commutating principles to the multiple-output converter of the present invention, an input capacitor is successively charged by each successive difunction signal of the plurality of interplexed difunction signal trains applied to the multiple-output device. After each charge of the input capacitor, the input capacitor is shunted, by the output commutator, across a corresponding one of a plurality of separate resistor-capacitor averaging units included in the converter. In this manner, a charge is developed across the capacitor of each averaging unit corresponding in magnitude and polarity to the average value of the signal of a corresponding one of the plurality of input difunction signal trains.

It is, therefore, an object of the present invention to provide a multiple-input multiple-output system for converting a plurality of simultaneously applied analog signals to a corresponding plurality of interplexed difunction signal trains for application to an electronic computer or switching system and for converting a plurality of interplexed difunction signal trains which may be produced by the computer to a corresponding plurality of separate analog output signals.

It is also an object of the present invention to provide a multiple-input device, including but a single analog-to-difunction converter, for converting a plurality of applied analog signals to corresponding difunction signal trains.

A further object of the present invention is to provide a multiple-output device for converting a plurality of interplexed difunction signal trains to corresponding separate analog output signals.

Another object of the present invention is to provide a commutated multiple-input device wherein the major elements of a single analog-to-difunction converter are utilized in a time-shared operation upon a plurality of applied analog signals to produce corresponding difunction signal trains.

Still another object of the present invention is to provide a commutated multiple-input device of the above class wherein a single time-shared sensing element, and a single time-shared standard signal source operate upon a plurality of integral signals developed by a plurality of simple resistor-capacitor integrators.

It is yet another object of the present invention to provide a commutator for serially receiving on an input terminal a plurality of applied signals and for developing on separate output terminals a corresponding plurality of output signals accurately representing the magnitude of the respective input signals relatively independently of any varying impedance between the input and output terminals.

It is a still further object of the present invention to provide a commutator for simultaneously receiving a plurality of applied signals on a corresponding plurality of separate input terminals and for serially developing on an output terminal a corresponding plurality of output signals accurately representing the magnitudes of the respective input signals relatively independently of any varying impedance between the input and output terminals.

The novel features which are believed to be characteristic of the invention, both as to its organization and method of operation, together with further objects and advantages thereof, will be better understood from the following description considered in connection with the accompanying drawing in which a preferred embodiment of the invention is illustrated by way of example. It is to be expressly understood, however, that the drawing is for the purpose of illustration and description only, and are not intended as a definition of the limits of the invention.

The figure is a schematic circuit diagram, partially in block form, of an embodiment of the multiple-input multiple-output system of the present invention.

Referring now to the drawing, there is shown in the figure an embodiment of the multiple-input multiple-output system of the present invention illustrated in conjunction with a computer 2 and including a multiple-input converter 3 and a multiple-output converter 4, both indicated by broken lines. Multiple-input converter 3 is operable in response to timing signals $t_p$ from computer 2 for converting applied analog voltage signals $V_a$, $V_b$, $V_c$, $V_d$ to a series of difunction signals $D_{a1}$, $D_{b1}$, $D_{c1}$, $D_{d1}$, $D_{a2}$ $D_{b2}$, $D_{c2}$, $D_{d2}$ . . . $D_{an}$, $D_{bn}$, $D_{cn}$, $D_{dn}$ comprised of interplexed equivalent difunction signal trains $D_{a1}$, $D_{a2}$ . . . $D_{an}$; $D_{b1}$, $D_{b2}$ . . . $D_{bn}$; $D_{c1}$, $D_{c2}$ . . . $D_{cn}$; $D_{d1}$, $D_{d2}$ . . . $D_{dn}$, which are impressed on computer 2 as the input information of the computer where signals $t_p$ demark the difunction signal intervals and where $n$ is an integer designating the total number of difunction signals included in each difunction signal train. Multiple-output converter 4 is operable to convert a series of difunction signals $D_{w1}$, $D_{x1}$, $D_{y1}$, $D_{z1}$, $D_{w2}$, $D_{x2}$, $D_{y2}$, $D_{z2}$ . . . $D_{wn}$, $D_{xn}$, $D_{yn}$, $D_{zn}$ representing output information of computer 2 developed by a bistable flip-flop B associated therewith and comprising interplexed difunction signal trains $D_{w1}$, $D_{w2}$ . . . $D_{wn}$; $D_{x1}$, $D_{x2}$ . . . $D_{xn}$; $D_{y1}$, $D_{y2}$ . . . $D_{yn}$; and $D_{z1}$, $D_{z2}$ . . . $D_{zn}$; to equivalent analog output signals $V_w$, $V_x$, $V_y$ and $V_z$, respectively, which are impressed on corresponding utilization devices 11, 12, 13 and 14.

It should be noted at the outset that analog signals are herein identified by the upper case letter "V," and difunction signals by the upper case letter "D." It should also be noted that each difunction signal of a difunction signal train is further identified by the same lower case letter subscript that is utilized as a subscript for identifying the particular analog signal represented by the difunction signal train. In addition, whenever practical, other signals associated with the circuitry of the present invention are identified by lower case letter subscripts utilized for identifying corresponding analog signals.

Referring with particularity to multiple-input converter 3, included therein is an integrating circuit 21 indicated by broken lines, an input commutator generally designated as 22 and having first and second sections A and B, respectively, a sensing element 23 indicated by broken lines and a standard signal source generally designated as 24. Applied analog signals $V_a$, $V_b$, $V_c$ $V_d$ are directly impressed on integrating circuit 21 which in response thereto converts the analog signals to corresponding integral signals $I_a$, $I_b$, $I_c$, $I_d$ representing the integral with respect to time of the respective analog signals. This is accomplished by including within integrating circuit 21 separate integrators 25, 26, 27 and 28 for integrating applied analog signals $V_a$, $V_b$, $V_c$, and $V_d$, respectively, each integrator comprising an integrating resistor R and an integrating capacitor C identified by subscripts corresponding to the subscript identifying the analog signal applied thereto.

Integral signals $I_a$, $I_b$, $I_c$, $I_d$ are impressed on section A of input commutator 22 which is operable to successively and cyclically sample the integral signals to produce sampling signals $S_{a1}$, $S_{b1}$, $S_{c1}$, $S_{d1}$, $S_{a2}$, $S_{b2}$, $S_{c2}$, $S_{d2}$ . . . $S_{an}$, $S_{bn}$, $S_{cn}$, $S_{dn}$ across a sampling capacitor $C_i$ which are applied to sensing element 23, each sampling signal being applied to the sensing element during a corresponding difunction signal interval. More specifically, during each difunction signal interval, section A of commutator 22 is operable to develop across sampling capacitor $C_i$ a sampling signal representing the amplitude and polarity during the interval of a corresponding one of the integral signals $I_a$, $I_b$, $I_c$, $I_d$. Thus sampling signals $S_{a1}$, $S_{b1}$, $S_{c1}$, $S_{d1}$ are developed across capacitor $C_i$ during four respective difunction signal intervals representing the values of integral signals $I_a$, $I_b$, $I_c$, $I_d$, respectively, during the corresponding difunction signal intervals, and so forth, sampling signals $S_{an}$, $S_{bn}$, $S_{cn}$, $S_{dn}$, representing the values of signals $I_a$, $I_b$, $I_c$, $I_d$ during four successive terminal difunction signal intervals.

In response to sampling signals $S_{a1}$, $S_{b1}$, $C_{c1}$, $S_{d1}$, $S_{a2}$, $S_{b2}$, $S_{c2}$, $S_{d2}$ . . . $S_{an}$, $S_{bn}$, $S_{cn}$, $S_{dn}$ and during signals $t_p$, sensing element 23 generates the desired difunction signal series $D_{a1}$, $D_{b1}$, $D_{c1}$, $D_{d1}$, $D_{a2}$, $D_{b2}$, $D_{c2}$, $D_{d2}$ . . . $D_{an}$, $D_{bn}$, $D_{cn}$, $D_{dn}$ by generating a difunction signal during each difunction signal interval having a first value if the sampling signal received during the interval exceeds a predetermined reference level and having a second value if the sampling signal is less than the predetermined reference level. Although the sensing element may take various structural forms so long as it is capable of performing the above functions, sensing element 23 is herein illustrated as a sensing element fully described and illustrated in the previously referred to Hansen's patent and is seen to include a D.C. amplifier 29 for amplifying the sampling signals impressed thereon to produce an amplified output signal representing the amplitudes of the sampling signals, a bistable flip-flop A for producing the desired difunction output signals $D_{a1}$, $D_{b1}$, $D_{c1}$, $D_{d1}$, $D_{a2}$, $D_{b2}$, $D_{c2}$, $D_{d2}$ . . . $D_{an}$, $D_{bn}$, $D_{cn}$, $D_{dn}$ on a first output A of the flip-flop and for producing difunction complement output signals $D'_{a1}$, $D'_{b1}$, $D'_{c1}$, $D'_{d1}$, $D'_{a2}$, $D'_{b2}$, $D'_{c2}$, $D'_{d2}$ . . . $D'_{an}$, $D'_{bn}$, $D'_{cn}$, $D'_{dn}$ on a second output A' of the flip-flop, and a pair of logical "and" gates 30, 31 responsive respectively to the amplified output signal and timing pulses $t_p$ for producing flip-flop control signals SA, ZA for controlling the conductive states of flip-flop A. Gate 30 may be a conventional voltage level gate for passing a negative pulse ($t_p$) when the amplifier output signal has a high level and gate 31 may be a conventional pulse-pedestal gate for passing signal $t_p$ when the amplifier output signal has a low level.

It should be understood at the outset, and it will become apparent from the ensuing discussion to those skilled in the art, that although the concepts of the present invention are not so limited, it is hereinafter assumed for convenience of explanation that each difunction output signal is produced by converter 3 during a corresponding difunction signal interval beginning with a first timing signal $t_p$ and ending with a subsequent second signal $t_p$. Accordingly, the conductive state of flip-flop A is only changed coincident with a timing pulse $t_p$, the value of each difunction signal thereby being determined by the conductive state of flip-flop A during the difunction signal interval occurring in time between two consecutive timing pulses $t_p$.

In accordance with the principles previously discussed, a unit quantity representing the complement of the sign-value of each difunction signal generated is obtained during each difunction signal interval by stabilizing the amplitudes of the difunction-complement signals and applying these stabilized signals to a standard capacitor. Accordingly, standard signal source 24 includes an upper and lower clamping circuit 32 for stabilizing difunction-complement signals $D'_{a1}$, $D'_{b1}$, $D'_{c1}$, $D'_{d1}$, $D'_{a2}$, $D'_{b2}$, $D'_{c2}$, $D'_{d2}$ . . . $D'_{an}$, $D'_{bn}$, $D'_{cn}$, $D'_{dn}$ at predetermined upper and lower limits as determined by clamping voltages $E_1$ and $E_2$, respectively, applied from voltage sources (not shown) through respective upper and lower clamping diodes 33 and 34. The resulting series of stabilized difunction signals are sequentially applied to a standard capacitor $C_s$, includable in standard signal source 24, by operation of section M of input commutator 22, each difunction-complement signal being applied to capacitor $C_s$ for a sufficient time interval to insure that the capacitor is fully charged to the voltage level of the stabilized difunction-complement signal. Thus the resulting charge in capacitor $C_s$ is determined only by its capacitance and amplitude of the applied difunction-complement signal. By selecting a relatively small capacitor as standard capacitor $C_s$, the required time interval may be made relatively short compared to a difunction signal interval. In this manner, a standard charge is obtained in capacitor $C_s$ following the generation of each difunction output signal representing the opposite or complement of the sign-value of the difunction output signal generated. As each standard charge is obtained in capacitor $C_s$, the standard charge is in turn fed-back by the further operation of section B of input commutator 22 to the integrating capacitor of a corresponding one of the integrators, standard charges from stabilized difunction-complement signals $D_a'$, $D_b'$, $D_c'$, $D_d'$ being fed-back to integrating capacitors $C_a$, $C_b$, $C_c$ and $C_d$, respectively, as corresponding signals $F_a$, $F_b$, $F_c$ and $F_d$.

From the preceding discussion, therefore, it is apparent that sensing element 23 and standard signal source 24 of multiple-input converter 3 are utilized on a time-shared basis by operation of commutator 22. To accomplish this, section A of the commutator must be capable of accurately and reliably applying each of the integral signals $I_a$, $I_b$, $I_c$ and $I_d$ in a sequential and repetitive manner to the input of sensing element 23 to sequentially obtain sampling signals $S_{a1}$, $S_{b1}$, $S_{c1}$, $S_{d1}$, $S_{a2}$, $S_{b2}$, $S_{c2}$, $S_{d2}$ . . . $S_{an}$, $S_{bn}$, $S_{cn}$, $S_{dn}$ during the corresponding signal intervals. Similarly, it is required that Section B of the commutator be operable to accurately and reliably feed back each unit charge obtained in standard capacitor $C_s$ to a corresponding one of the integrators of integrating circuit 21.

It is evident from the previous discussion that conventional commutating techniques are not sufficiently reliable to accurately conform to the above requirements. Accordingly, unique commutating techniques previously referred to are herein employed. Before considering in detail the specific structure and operation of sections A and B of commutator 22 of Fig. 1, it is conducive to clarity of explanation to first consider in greater detail the fundamental concepts of the unique commutation techniques employed throughout the structure of the present invention.

In accordance with the commutating techniques of the present invention, signals are accurately and reliably commutated or selectively transferred from initial or primary points in electrical equipment to selected secondary positions in the circuitry of the equipment by a signal commutation technique herein referred to as "charge-equilibrium" commutation. According to charge-equilibrium commutation, any given electrical signal may be accurately and reliably commutated from a primary to a secondary position in a circuit by initially charging a first capacitor located at the primary position of the circuit to a charge representing the magnitude and polarity of the given electrical signal, then shunting the first capacitor by connecting circuitry across a second capacitor located at the secondary position of the circuit for a sufficient time interval to establish charge-equilibrium between the two capacitors, a condition which occurs when the voltage developed across each capacitor is exactly equal to the voltage across the other capacitor. As is demonstrated hereinbelow, the value of the final equilibrium voltage established across both shunted capacitors is a function of the initial voltages (or charges) and the relative capacitance of the two capacitors, and is completely independent of the nature of the impedance connecting the capacitors. Since the relative capacitance of the two capacitors is a constant, the final equilibrium voltage, which may be directly obtained from across the second capacitor at the secondary location, accurately represents the magnitude and polarity of the electrical signal applied at the primary location.

Consider the following analysis of the above "charge-equilibrium" commutation technique in which it is assumed that a first capacitor is located at a primary position in an electrical circuit, has a capacitance $C_1$, and has been charged to an initial charge $Q_1$ at which there is a corresponding voltage $E_1$ across the capacitor. It will be assumed that the voltage $E_1$ is to be commutated to a secondary position of the circuit where there is located a second capacitor having a capacitance $C_2$ and having a residual charge $Q_2$ and a corresponding voltage $E_2$ across the capacitor.

The capacitance, voltage and charge of each of the capacitors before they are shunted together may be expressed by the fundamental relationships:

$$E_1=\frac{Q_1}{C_1};\ E_2=\frac{Q_2}{C_2} \tag{1}$$

where the sum Q of the charges of both capacitors is obviously, $$Q=Q_1+Q_2 \tag{2}$$

Consider now the effect of connecting both capacitors together for a sufficient time interval to reach charge-equilibrium as evidenced by an equilibrium voltage E being developed across both capacitors. Disregarding capacitor-leakage which is usually insignificant for purposes of the present analysis, the sum of the charges Q of both capacitors will remain unchanged. Since the two capacitors are connected in parallel, the capacitance of the individual capacitors is additive to giving a total capacitance C of:

$$C=C_1+C_2 \tag{3}$$

and the equilibrium voltage E may be expressed as:

$$E=\frac{Q}{C}=\frac{Q_1+Q_2}{C_1+C_2} \tag{4}$$

Substituting in Eq. 4 the equivalent values for $Q_1$ and $Q_2$ from Eq. 1 above, an expression for E is obtained:

$$E=\frac{E_1C_1+E_2C_2}{C_1+C_2}=E_1\frac{C_1}{C_1+C_2}+E_2\frac{C_2}{C_1+C_2} \tag{5}$$

Since both $C_1$ and $C_2$ are constants, Eq. 5 above may be rewritten as:

$$E=E_1k_1+E_2k_2 \tag{6}$$

where $$k_1=\frac{C_1}{C_1+C_2},\ \text{and}\ k_2=\frac{C_2}{C_1+C_2}$$

From the above analysis, it is apparent that the final or equilibrium voltage E developed across the capacitors in shunt is completely independent of the impedance of the connection between the two capacitors. It is further apparent from Eq. 6 above that if the values for $E_1$, $E_2$ $k^1$ and $k_2$ are predeterminable, the value of the equilibrium voltage E will be accurately predictable.

In some applications of the above analyzed commutating technique, the value of voltage $E_2$ may not be conveniently predeterminable. In such event, the term $E_2k_2$ of Eq. 6 above, will represent an error function of the commutating process. Accordingly it is desirable under these conditions to reduce as near zero as possible the relative value of the error term. This may be accomplished in two ways. The first alternative is to make the relative values of constant $k_2$ small as compared to the value of constant $k_1$ by selecting a comparatively large capacitance $C_1$ and a comparatively small capacitance $C_2$ for the respective capacitors. The second alternative is to provide means for reducing $E_2$ to zero before each signal commutation by discharging the corresponding capacitor after each signal transfer. By the latter method, since $E_2$ is always 0 in Eq. 6 above, the error is completely eliminated.

With reference to the application of these techniques to multiple-input converter 3 of Fig. 1, it is apparent that in order to sequentially obtain sampling signals $S_{a1}$, $S_{b1}$, $S_{c1}$, $S_{d1}$, $S_{a2}$, $S_{b2}$, $S_{c2}$, $S_{d2}$ . . . $S_{an}$, $S_{bn}$, $S_{cn}$, $S_{dn}$ during corresponding difunction signal intervals across sampling capacitor $C_1$, in accordance with the above analyzed commutating technique, commutator section A of commutator 22 should be operable to successively and cyclically shunt each of the integrating capacitors $C_a$, $C_b$, $C_c$, $C_d$ across sampling capacitor $C_1$ during corresponding difunction signal intervals for sufficient time to establish in each instance charge-equilibrium between the integrating and sampling capacitors. It is also desirable that commutator section A be operable to discharge sampling capacitor $C_1$ antecedent to the development of each sampling signal to thereby eliminate any error in the commutation process caused by residual voltages $E_2$ across capacitor $C_1$, as expressed by the term $E_2k_2$ of Eq. 6 above.

Although various forms of commutators will suggest themselves, to those skilled in the art, for performing the above operations, commutator section A of commutator 22 is herein illustrated as a conventional brush-segment commutator comprising eight electrical insulated commutator segments designated $1_s$ to $8_s$, respectively, and a single commutator brush 34 for successively making and breaking electrical contact in a sequential and cyclical manner with each of the commutator segments in the order indicated by an arrow.

Integral signals $I_a$, $I_b$, $I_c$ and $I_d$ are directly applied, respectively, to commutator segments $1_s$, $3_s$, $5_s$ and $7_s$ by appropriate electrical leads originating from the upper terminals of the corresponding integrator capacitors $C_a$, $C_b$, $C_c$, $C_d$ as illustrated. Commutator segments $2_s$, $4_s$, $6_s$ and $8_s$ are in turn electrically interconnected and commonly connected to a source of ground potential indicated by the ground symbol. Rotating commutator brush 34 is electrically coupled through a current limiting resistor 35 to an upper terminal of sampling capacitor $C_1$. The lower terminals of sampling capacitor $C_1$ and each of the integrating capacitors $C_a$, $C_b$, $C_c$, $C_d$ are connected to ground. It is evident that as commutator brush 34 is rotated in a counterclockwise direction as indicated by the arrows, sampling capacitor $C_1$ is successively shunted across integrating capacitors $C_a$, $C_b$, $C_c$, $C_d$ in that order as brush 34 makes successive contact with segments $1_s$, $3_s$, $5_s$ and $7_s$, respectively, and is successively shunted to the source of ground potential as the commutator brush contacts segments $2_s$, $4_s$, $6_s$ and $8_s$, respectively.

The rotational velocity of commutator brush 34 is synchronized with the repetition rate of timing signals $t_p$ so that sampling capacitor $C_1$ is successively shunted with a corresponding one of the integrating capacitors $C_a$, $C_b$, $C_c$, $C_d$ and subsequently discharged through resistor 35 to ground during each difunction signal interval. This is accomplished in the particular example shown by rotating brush 34 at a constant angular velocity of one-fourth of a revolution per difunction signal interval. In this manner, the error term ($k_2E_2$) of Eq. 6 above is eliminated since capacitor $C_1$ is discharged after each sampling signal is produced, so as to thereby remove any residual charge therein. As a consequence the residual voltage $E_2$ in the error term above is always zero.

It is obviously desirable to charge and discharge capacitor $C_1$ in relatively short time intervals so as to assure that charge-equilibrium will be attained during each passage of brush 34 over a segment of commutator section A. This may be accomplished by selecting a relatively small valued resistance for resistor 35 and by making the capacitance of sampling capacitor $C_1$ relatively small in comparison with integral capacitors $C_a$, $C_b$, $C_c$, $C_d$. The basic purpose of resistor 25 is to limit the initial current flowing through the shunting circuitry as each integral capacitor is shunted with sampling capacitor $C_1$, and to limit the discharge current each time sampling capacitor $C_1$ is discharged. Resistor 35 may therefore be selected as small as the current limits of the associated circuitry will allow.

Although it will be evident to those skilled in the art that many combinations of value for sampling capacitor $C_1$, current-limiting resistor 35, and integrating capacitors $C_a$, $C_b$, $C_c$, $C_d$, meet the above requirements, typical suggested values, herein employed, are as follows:

| | | |
|---|---|---|
| $C_1$=0.1 mfd. | $C_a$=70.0 mfd. | $C_c$=70.0 mfd. |
| $R_{35}$=1000 ohms. | $C_b$=70.0 mfd. | $D_d$=70.0 mfd. |

As previously mentioned, in order for standard signal source 24 to be operable on a time-shared basis, section B of commutator 22 must be capable of accurately and reliably transferring each standard charge developed in standard capacitor $C_s$ into a corresponding one of the integrating capacitors $C_a$, $C_b$, $C_c$, $C_d$. More specifically, it is desired that section A be operable during each difunction signal interval to cause standard capacitor $C_s$ to be charged to a standard charge by the amplitude stabilized difunction-complement signal generated by sensing element 23 during the difunction signal interval, and to introduce the standard charge so developed into a corresponding one of the integrating capacitors. To accurately and reliably accomplish the above objectives, a modification of the charge-equilibrium commutating techniques previously described are employed. As an aid to an understanding of the operation of section B of commutator 22, it is advantageous to first analyze briefly the underlying concepts herein employed for commutating energy in the form of charge increments independently of variable impedance presented by conventional commutators.

Assume as is the case in the specific converter shown in the figure, that it is desired to transfer a standard charge (designated $Q_s$) in standard capacitor $C_s$ to one of the intergrating capacitors, for example capacitor $C_a$, so that its charge (designated $Q_a$) is incrementally changed by an amount $\Delta Q_a$ proportional to $Q_s$. In continued operation the net changes in the charge $Q_a$ attributable to the delivery of such charge increments will then represent the integral or summation of the successive standard charges $Q_s$. Considering now a single charge transfer of this type, the charge increment $\Delta Q_a$ may be expressed as:

$$\Delta Q_a = Q_a' - Q_a \qquad (7a)$$

where $Q_a$ is the initial charge in capacitor $C_a$ and $Q_a'$ is the final charge, obtained when charge-equilibrium has occurred, as represented by a final equilibrium voltage E being established across both capacitors when they are connected together.

Since the equilibrium voltage E across the two capacitors in parallel is also across the capacitor $C_a$, it can be stated that:

$$E = \frac{Q_a'}{C_a} = \frac{Q_a + Q_s}{C_a + C_s} \qquad (7b)$$

solving for $Q_a'$ in Eq. 7*b* and substituting Eq. 7*a* there is obtained the equation:

$$\Delta Q_a = \left(\frac{C_a}{C_a + C_s}\right) Q_s - \left(\frac{C_s}{C_a + C_s}\right) Q_a \qquad (7c)$$

where it is noted that the expressions in parentheses are constants for any two fixed capacitors.

Since, as stated before, it is desired that $\Delta Q_a$ be proportional to $Q_s$ so that successive charge transfers will have the effect of an integration of the charges $Q_s$, it is clear that the term $$\left(\frac{C_s}{C_a + C_s}\right) Q_a$$

may be considered an error term which should be rereduced to relatively small values so as to reduce its effect on the desired integration. This is accomplishd by providing $C_s$ as a small capacitor relative to $C_a$ (so that the constant $$\frac{C_s}{C_a+C_s}$$

has a very small magnitude while the constant $$\frac{C_a}{C_a+C_s}$$

has a corresponding relatively large value) and also by maintaining $Q_a$ at small values.

This second step, the maintenance of $Q_a$ at small values is automatically accomplished in the input converter of the present invention. The normal operation of the converter is to continually tend to null, to reduce to zero any signals existing on the integrating capacitors. Charges which are fed-back to an integrating capacitor are generated in such sense that they tend to reduce to zero the signal existing on the integrating capacitor. Thus if capacitor $C_a$ is positively charged, the succeeding feedback charge $Q_s$ will be negative so that the resultant charge increment $\Delta Q_a$ will tend to reduce $Q_a$. Therefore the charge $Q_a$ on the integrating capacitor is always maintained at very small values by virtue of this feedback or nulling operation, thus tending to further reduce the error described by the second term of Eq. 7*c*.

Values which have been successfully utilized for the integrating capacitors $C_a$, $C_b$, $C_c$ and $C_d$ and the standard capacitor $Q_s$ are listed below. Note the large ratio between the sizes of the integrating capacitors and the size of the standard capacitor $Q_s$. Typical values for the integrator resistors $R_a$, $R_b$, $R_c$ and $R_d$ and the current limiting resistors $R_{37}$—$R_{40}$ are also provided.

$C_a$, $C_b$, $C_c$, $C_d$=70 mfd. each
$C_s$=.03 mfd.
$R_a$, $R_b$, $R_c$, $R_d$=1 megohm each
$R_{37}$, $R_{38}$, $R_{39}$, $R_{40}$=100 ohms each Referring again to the figure, although it will be understood that various forms of commutators may be employed, commutator section B of commutator 22 is herein illustrated as a conventional brush-segment commutator similar to commutation section A in that the commutator includes eight electrical insulated commutator segments $\mathbf{1}_s$ to $\mathbf{8}_s$ inclusive, and a single commutator brush 36. Commutator brush 36 is rotated in a counterclockwise direction, as indicated by the arrows, in synchronism with and at the same angular velocity of commutator brush 34 of section A, thereby successively making and breaking electrical contact sequentially with each of the commutator segments $\mathbf{1}_s$, $\mathbf{2}_s$ . . . $\mathbf{8}_s$ in that order. This may be accomplished by affixing both commutator brushes 34 of section A and 36 of section B to the same rotating shaft (not shown) which is rotated at a uniform rotational velocity, in a counterclockwise direction, one-fourth of a revolution during each difunction signal interval as demarked by timing signals $t_p$ generated by computer 2.

Stabilized amplitude difunction-complement signal series $D'_{a1}$, $D'_{b1}$, $D'_{c1}$, $D'_{d1}$, $D'_{a2}$, $D'_{b2}$, $D'_{c2}$, $D'_{d2}$ . . . $D'_{an}$, $D'_{bn}$, $D'_{cn}$, $D'_{dn}$, are applied simultaneously to commutator segments $\mathbf{1}_s$, $\mathbf{3}_s$, $\mathbf{5}_s$ and $\mathbf{7}_s$ which are commonly electrically interconnected. Commutator segments $\mathbf{2}_s$, $\mathbf{4}_s$, $\mathbf{6}_s$ and $\mathbf{8}_s$ are coupled, respectively, to the upper terminals of integrating capacitors $C_a$, $C_b$, $C_c$, and $C_d$ through respective current limiting resistors 37, 38, 39 and 40. Standard capacitor $C_s$ is directly connected between commutator brush 36 and ground.

Consider now the sequence of operation of commutator section B. As hereinbefore described commutator brush 36 is rotated at a uniform rotational velocity of one-fourth of a revolution during each difunction signal interval, brush 36 making electrical contact first with an odd numbered commutator segment ($\mathbf{1}_s$, $\mathbf{3}_s$, $\mathbf{5}_s$ or $\mathbf{7}_s$) and either a prior or a subsequent even numbered segment ($\mathbf{2}_s$, $\mathbf{4}_s$, $\mathbf{6}_s$ or $\mathbf{8}_s$) during each difunction signal period. From the preceding discussion, it is apparent that during each instance that brush 36 contacts an odd numbered segment, the stabilized difunction-complement signal generated by flip-flop A during the interval is impressed on standard capacitor $C_s$. Whenever brush 36 contacts an even numbered segment, on the other hand, standard capacitor $C_s$ is shunted across an associated one of the integrating capacitors $C_a$, $C_b$, $C_c$, $C_d$. It should be understood at the outset that during each contact of brush 36 with an odd numbered segment, contact is made for sufficient time to completely charge standard capacitor $C_s$ to a standard charge as determined by the difunction-complement signal then being generated by sensing element 23. Further, during each contact of brush 36 with an even numbered segment, contact is made for sufficiently long time intervals to insure charge-equilibrium between the standard capacitor and the integrating capacitor shunted thereto by the electrical contact.

Rather than describing in greater detail the operational sequence of commutator section B as an isolated unit at this time, it is advantageous for a clearer understanding of the operation of multiple-input converter 3 to simultaneously consider the joint operation of both sections A and B of commutator 22 in conjunction with the remainder of the converter circuitry during successive predefined timing intervals.

As previously mentioned, the rotation of commutator brush 34 of section A is synchronized with and rotated at the same angular velocity as commutator brush 36 of section B, each brush contacting corresponding like-numbered associated commutator segments at the same instant and each commutator brush being rotated counterclockwise at a constant angular velocity of one-fourth a revolution during each difunction signal interval.

In the ensuing discussion, assume that the operation of multiple-input converter 3 is observed during an observation period occurring after the converter has been put in operation to produce difunction output signal series $D_{a1}$, $D_{b1}$, $D_{c1}$, $D_{d1}$, $D_{a2}$, $D_{b2}$, $D_{c2}$, $D_{d2}$ . . . $D_{an}$, $D_{bn}$, $D_{cn}$ and $D_{dn}$ generated during the 1st, 2nd, 3rd, 4th, 5th, 6th, 7th, 8th . . . $(n-3)$rd, $(n-2)$nd, $(n-1)$st, and $n$th difunction signal intervals, respectively, of the converter operation in response to applied analog signals $V_a$, $V_b$, $C_c$, $V_d$. Although the detailed operation of converter 3 might readily be explained for an observational period beginning with the moment the converter is first put in operation, there are certain advantages from the point of view of ease and clarity of explanation in utilizing an observational period beginning after the converter is in operation. Accordingly, it is assumed that the observation period begins coincident with a timing pulse $t_p$ demarking the beginning of the 5th difunction signal interval (corresponding to production of difunction output signal $D_{a2}$) at which time commutator brushes 34 and 36 are in positions illustrated, i.e. approximately midway between their respective adjacent commutator segments $\mathbf{1}_s$ and $\mathbf{2}_s$. For convenience, the space between adjacent commutator segments of each commutator section is hereinafter referred to by the symbols identifying the adjacent segments separated by a dash (—). Thus the positions of commutator brushes 34 and 36 at the beginning of the observational period are each identified as positions $\mathbf{1}_s$—$\mathbf{2}_s$.

Since the difunction signal intervals are demarked by timing signals $t_p$, it is advantageous to utilize some system for identifying the individual timing signals produced by computer 2 during an operational period of multiple-input converter 3. Accordingly, each timing signal $t_p$ is identified by a subscript number corresponding to the number of the difunction signal interval whose end is indicated by the timing signal. Thus, for example, timing signals $t_{p1}$, $t_{p2}$, $t_{p3}$ . . . $t_{pn}$ demark the 1st, 2nd, 3rd . . . $n$th difunction signal intervals, respectively. Consistent with this nomenclature, the first timing signal occurring immediately after converter 3 is put in operation and demarking the beginning of the first difunction signal interval is identified as timing signal $t_{p0}$. Since reference to timing signals $t_p$ is a convenient method of referring to specific moments in time during the operation converter 3, points in time are sometimes hereinafter referred to with respect to specific timing signals, as for example, time $t_{p1}$, time $t_{p2}$, etc.

Since both commutator brushes 34, 36 are rotated in unison in a counterclockwise direction one-fourth of a revolution during each difunction signal interval, and are at their respective $1_s$—$2_s$ positions at time $t_{p4}$ (demarking the end of the 4th and the beginning of the 5th difunction signal period), then both commutator brushes occupied position $7_s$—$8_s$ at time $t_{p3}$, position $5_s$—$6_s$ at time $t_{p2}$, position $3_s$—$4_s$ at time $t_{p1}$, and were initially in position $1_s$—$2_s$ at time $t_{p0}$ when the converter was first put in operation. To generalize, therefore, at times $t_{p0}$, $t_{p4}$, $t_{p8}$ . . . $t_{p4r}$ each of the commutator brushes 34, 36 will be at their respective $1_s$—$2_s$ positions as indicated in Fig. 1 by an arrow-identified, dotted radial line, where $r$ is the number of revolutions completed by the commutator brushes. At times $t_{p1}$, $t_{p5}$, $t_{p9}$ . . . $t_{p(4r+1)}$, each commutator brush will be at their respective $3_s$—$4_s$ positions as indicated in Fig. 1 by a second arrow-identified, dotted radial line. Similarly, position $5_s$—$6_s$ of the commutator brushes will be obtained coincident in time with timing signals $t_{p2}$, $t_{p6}$, $t_{p10}$ . . . $t_{p(4r+2)}$; and position $7_s$—$8_s$ of the brushes will occur at times $t_{p3}$, $t_{p7}$, $t_{p11}$ . . . $t_{p(4r+3)}$; respectively.

Having established a method for identifying particular difunction signal intervals, corresponding difunction output signals, individual sampling signals, and the separate timing signals occurring during an operational period of converter 3, consider now in detail the sequence of operation of the elements of multiple-input converter 3 during the above defined observation period.

Immediately prior to time $t_{p4}$, i.e. during the latter portion of the 4th difunction signal interval, commutator brushes 34, 36 were in their respective $1_s$ positions. Accordingly at that time sampling capacitor $C_i$ was shunted with integrating capacitor $C_a$ by commutator section A, and difunction-complement signal $D'_{d1}$ was applied to standard capacitor $C_s$ by means of commutator section B. At time $t_{p4}$, therefore, a charge, representing the magnitude and polarity of applied analog signals $V_a$ during the 4th difunction signal interval, is stored in sampling capacitor $C_i$ resulting in sampling signal $S_{a2}$ being applied to sensing element 23. As a consequence, flip-flop A of sensing element 23 is triggered coincident with timing signal $t_{p4}$ to the proper conductive state to produce difunction output signal $D_{a2}$ and difunction-complement signal $D'_{a2}$ during the ensuing 5th difunction signal interval. Also at time $t_{p4}$, standard capacitor $C_s$ has a standard charge corresponding to the complement value of difunction output signal $D_{d1}$, i.e. corresponding to the value of signal $D'_{d1}$.

During the ensuing 5th difunction signal interval, brushes 34, 36 of commutator sections A and B successively contact their respective $2_s$ and $3_s$ commutator segments. As brush 34 of section A contacts segment $2_s$, sampling capacitor $C_i$ is discharged. Subsequent contact of brush 34 with segment $3_s$ causes capacitor $C_i$ to be shunted with integrating capacitor $C_b$ to establish sampling signal $S_{b2}$ across the capacitor. Thus when brush 34 attains the $3_s$—$4_s$ position at time $t_{p5}$, sampling signal $S_{b2}$ will appear across capacitor $C_i$. Thus at time $t_{p5}$, flip-flop A of sensing element 23 will be triggered by timing signal $t_{p5}$ in accordance with the value of sampling signal $S_{b2}$ to produce difunction output signal $D_{b2}$ during the ensuing 6th difunction signal interval.

Consider now the function of commutator section B during the 5th difunction signal interval. When brush 36 is in the $2_s$ position, standard capacitor $C_s$ is shunted across integrating capacitor $C_d$ thereby causing the standard charge stored therein and representing difunction signal $D'_{d1}$ to be transferred to the corresponding integrating capacitor $C_d$. During the latter portion of the 5th difunction signal period when brush 36 contacts segment $3_s$ the difunction-complement signal $D'_{a2}$, produced by sensing element 23 during the difunction signal interval, is impressed on standard capacitor $C_s$. Thus when brush 36 arrives at position $3_s$—$4_s$ at time $t_{p5}$, a charge representative of difunction signal $D'_{a2}$ is stored in the standard capacitor $C_s$.

During the ensuing 6th difunction signal interval, sampling capacitor $C_i$ is discharged as brush 34 of section A assumes the $4_s$ position, and subsequently charged from integrating capacitor $C_c$ to produce sampling signal $S_{c2}$ as brush 34 contacts segment $5_s$. Accordingly at time $t_{p6}$, flip-flop A of sensing element 23 is triggered according to the value of signal $S_{c2}$ to produce difunction output signal $D_{c2}$. Also during the 6th difunction signal interval, the standard charge in capacitor $C_s$ representing difunction signal $D'_{a2}$ is transferred to the corresponding integrating capacitor $C_a$ as brush 36 assumes position $4_s$, and a new standard charge corresponding to difunction signal $D'_{b2}$ is introduced in capacitor $C_s$ as brush 36 contacts segment $5_s$.

As brush 34 of section A rotates from position $5_s$—$6_s$ to position $7_s$—$8_s$ during the subsequent 7th difunction signal interval, sampling capacitor $C_i$ is successively discharged to ground and subsequently charged from integrating capacitor $C_d$ to produce sampling signal $S_{d2}$ at time $t_{p7}$. Thus at time $t_{p7}$, flip-flop A is triggered to the proper conductive state to produce difunction output signal $D_{d2}$ during the ensuing 8th difunction signal interval. As brush 36 of section B rotates from position $5_s$—$6_s$ to position $7_s$—$8_s$ during the 7th difunction signal interval, the standard charge in capacitor $C_s$ corresponding to difunction signal $D'_{b2}$ is first transferred to the corresponding integrating capacitor $C_b$, and a new standard charge is then introduced into the standard capacitor as difunction-complement signal $D'_{c2}$ is applied thereto.

During the subsequent 8th difunction signal interval, brushes 34 and 36 both rotate from their respective $7_s$—$8_s$ position to their respective $1_s$—$2_s$ position thereby returning to their initial positions to complete the second revolution of each brush at time $t_{p8}$. During the above interval covering the last one-fourth of the second revolution of each brush, standard capacitor $C_i$ is first discharged and subsequently charged from integrating capacitor $C_a$ to produce sampling signal $S_{a3}$, and the charge previously stored in standard capacitor $C_s$ representing difunction output signal $D'_{c2}$ is transferred to integrating capacitor $C_c$, after which a new charge representing difunction output signal $D'_{d2}$ is entered in capacitor $C_s$. Thus at time $t_{p8}$, flip-flop A is triggered in accordance with sampling signal $S_{a3}$ to produce difunction output signal $D_{a3}$ during the subsequent 9th difunction signal interval, and a standard charge is in standard capacitor $C_s$ representing the value of the previously generated difunction output signal $D'_{d2}$ which is subsequently transferred to integrating capacitor $C_d$ during the ensuing 9th difunction signal interval.

The above process is repeated each subsequent revolution of brushes 34 and 36 of commutator sections A and B, one $D_a$, $D_b$, $D_c$ and $D_d$ difunction output signal being produced during each revolution.

As an aid to a better understanding of the sequence of operation of multiple input converter 3 during each revolution of commutator brushes 34 and 36 of commutator sections A and B, the above described operational steps during the second complete revolution of the brushes covering the 5th, 6th, 7th, and 8th difunction signal intervals are tabulated in Table I below.

*Table I*

| Brush Revolution | Difunction Interval | Brush Position | Commutator Section A | Commutator Section B |
|---|---|---|---|---|
| Last 1/4 of 1st. | 4th signal $D_{d1}$. | $7_s$—$8_s$ | FF-A set by $S_{d1}$ to form $D_{d1}$. | ------------------- |
| | | $8_s$ | $C_i$ discharged--- | $C_s$ and $C_c$ shunted. |
| | | $8_s$—$1_s$ | ------------------- | |
| | | $1_s$ | $C_i$ and $C_a$ shunted to form $S_{a2}$. | Charge $C_s$ to signal $D'_{d1}$. |
| Complete 2nd. | 5th signal $D_{a2}$. | $1_s$—$2_s$ | FF-A set by $S_{a2}$ to form $D_{a2}$. | |
| | | $2_s$ | $C_i$ discharged--- | $C_s$ and $C_d$ shunted. |
| | | $2_s$—$3_s$ | ------------------- | |
| | | $3_s$ | $C_i$ and $C_b$ shunted to form $S_{b2}$. | Charge $C_s$ by signal $D'_{a2}$. |
| | 6th signal $D_{b2}$. | $3_s$—$4_s$ | Set by $S_{b2}$ to produce $D_{b2}$. | |
| | | $4_s$ | $C_i$ discharged--- | $C_s$ and $C_a$ shunted. |
| | | $4_s$—$5_s$ | ------------------- | |
| | | $5_s$ | $C_i$ and $C_c$ shunted to form $S_{c2}$. | Charge $C_s$ by signal $D'_{b2}$. |
| | 7th signal $D_{c2}$. | $5_s$—$6_s$ | FF-A set by $S_{c2}$ to form $D_{c2}$. | |
| | | $6_s$ | $C_i$ discharged--- | $C_s$ and $C_b$ shunted. |
| | | $6_s$—$7_s$ | ------------------- | |
| | | $7_s$ | $C_i$ and $C_d$ shunted to form $S_{d2}$. | Charge $C_s$ by signal $D'_{c2}$. |
| | 8th signal $D_{d2}$. | $7_s$—$8_s$ | FF-A set by $S_{d2}$ to form $D_{d2}$. | |
| | | $8_s$ | $C_i$ discharged--- | $C_s$ and $C_c$ shunted. |
| | | $8_s$—$1_s$ | ------------------- | |
| | | $1_s$ | $C_i$ and $C_a$ shunted to form $S_{a3}$. | Charge $C_s$ by signal $D'_{d2}$. |

In Table I, in the third column thereof, sucessive positions of the brushes 34 and 36 of commutator sections A and B are tabulated for the last quarter of the first revolution of the brushes and for the complete second revolution of the brushes, the operations associated with each brush position in commutator sections A and B being shown in the fourth and fifth columns of Table I. As indicated, therefore, Table I lists all of the operations performed during the fourth and fifth through eighth difunction signal intervals for the production of difunction signal $D_{d1}$, and for the previously described production of signals $D_{a2}$, $D_{b2}$, $D_{c2}$, $D_{d2}$, respectively. Production of further signals, in continuing operation of the converter may, it is clear, be described by continuing Table I in the regular manner indicated.

Referring now with particularity to multiple-output converter 4 of the figure, it is seen that there is included therein a commutator C, standard output capacitor $C_{so}$, and a plurality of separate output circuits generally designated 41, 42, 43 and 44, respectively. As previously mentioned, converter 4 is operable to convert a series of applied difunction signals $D_{w1}$, $D_{x1}$, $D_{y1}$, $D_{z1}$, $D_{w2}$, $D_{x2}$, $D_{y2}$, $D_{z2}$ . . . $D_{wn}$, $D_{xn}$, $D_{yn}$, $D_{zn}$, produced by flip-flop B and comprised of interplexed difunction signal trains $D_{w1}$, $D_{w2}$ . . . $D_{wn}$; $D_{x1}$, $D_{x2}$ . . . $D_{xn}$; and $D_{z1}$, $D_{z2}$ . . . $D_{zn}$; to corresponding equivalent analog output signals $V_w$, $V_x$, $V_y$ and $V_z$, respectively, representing the average values of the corresponding difunction signal trains. Since the difunction signal series produced by flip-flop B in response to triggering signals SB and ZB from computer 2 represents output information of computer 2, it is convenient for purposes of explanation to assume some time relationship at the outset between the difunction signals of the applied difunction signal series and timing signal $t_p$ produced by computer 2. Accordingly, for purposes of clarity only, it is hereinafter assumed that each successive difunction signal of the applied difunction signal series is successively produced during a corresponding difunction signal interval as demarked by timing signals $t_p$ in the manner heretofore described.

Fundamentally, multiple-output converter 4 operates upon the principle of first separating the applied difunction signal series comprised of a plurality of interplexed difunction signal trains into corresponding separate difunction signal trains which are then applied to separate output circuits in such a manner that each output circuit thereby produces an analog output voltage representing the average value of the corresponding difunction signal trains.

As shown in the figure, for example, within output converter 4, commutator C receives the difunction signal series $D_{w1}$, $D_{x1}$, $D_{y1}$, $D_{z1}$, $D_{w2}$, $D_{x2}$, $D_{y2}$, $D_{z2}$ . . . $D_{wn}$, $D_{xn}$, $D_{yn}$, $D_{zn}$ and is operable for separating out these signals so as to apply the difunction signal train $D_{w1}$, $D_{w2}$ . . . $D_{wn}$ to output circuit 41 in such a way as to produce analogy signal $V_w$, apply the difunction signal train $D_{x1}$, $D_{x2}$ . . . $D_{xn}$ to output circuit 42 to produce analog signal $V_x$, apply the difunction signal train $D_{y1}$, $D_{y2}$ . . . $D_{yn}$ to circuit 43 to produce analog signal $V_y$, and apply difunction signal train $D_{z1}$, $D_{z2}$ . . . $D_{zn}$ to circuit 44 to produce analog signal $V_z$.

The hereinbefore described principles of charge-equilibrium commutation are utilized in accomplishing this result. As each difunction signal is produced by flip-flop B, commutator C functions to first apply the signal to standard capacitor $C_{so}$ to establish a standard charge in the capacitor representative of the value of the difunction signal, and then to subsequently shunt capacitor $C_{so}$ with a corresponding one of a plurality of output capacitors $C_w$, $C_x$, $C_y$ or $C_z$ (which are included in output circuits 41, 42, 43 and 44, respectively) for a sufficient time interval to establish charge-equilibrium between the two shunted capacitors.

In this way each signal of a difunction train is effectively applied via capacitor $C_{so}$ to the corresponding output capacitor $C_w$, $C_x$, $C_y$ or $C_z$. For example, the difunction signals $D_{x1}$, $D_{x2}$ . . . $D_{xn}$ are successively applied in this manner via capacitor $C_{so}$ to capacitor $C_x$. It will be shown, that with proper choice of the relative values of the capacitors, the net effect of application of the difunction signals in this manner to output capacitor $C_x$ is that the successive difunction signals $D_{x1}$, $D_{x2}$ . . . $D_{xn}$ are averaged or filtered to produce the corresponding analog signal $V_x$. In similar manner the signals of the other difunction signal trains are averaged or filtered to produce the corresponding analog output signals.

Before considering the structure and operation of converter 4 in detail it is advantageous to first demonstrate mathematically that in accordance with the hereinbefore described principles of charge-equilibrium signal transfer, successive application of difunction signals in this manner to an output capacitor can cause the difunction signals to be averaged to produce the correspondingly analog signal.

Consider, for purposes of example, the application via capacitor $C_{so}$ of the successive signals of the difunction train $D_{x1}$, $D_{x2}$ . . . $D_{xn}$ to output capacitor $C_x$. In operation, as before described, each difunction signal designated $D_x^i$ is first applied to capacitor $C_{so}$ for sufficient time to fully charge capacitor $C_{so}$ to the high or low level designated $E_s^i$ of the difunction signal thus developing a corresponding standard charge designated $Q_s^i$ in capacitor $C_{so}$. Capacitor $C_{so}$ as before described is then shunted across capacitor $C_x$, capacitor $C_x$ having a voltage designated $V_x^i$ and corresponding charge $Q_x^i$ established thereon immediately before it is shunted. When charge equilibrium is attained between the two shunted capacitors, as a result of the transfer of charge between capacitors $C_{so}$ and $C_x$, the charge $Q_x^i$ in capacitor $C_x$ is increased or decreased by a charge increment designated $\Delta Q_x^i$ to form a new charge $Q_x^{i+1}$ and the voltage $V_x^i$ is changed by a corresponding voltage increment $\Delta V_x^i$ to produce a new voltage $V_x^{i+1}$ across output capacitor $C_x$. The new voltage $V_x^{i+1}$ which is produced is a function of the size of the capacitors $C_{SO}$ and $C_x$ and of the magnitude of the previous voltages $E_s^i$ and $V_x^i$— that is $$V_x^{i+1}=f(C_x, C_{SO}, E_s^i, V_x^i)$$

What will be demonstrated is that this functional relationship corresponds to the equation of an averaging circuit or filter, that is that each new voltage $V_x^{i+1}$ is equal to the old voltage $V_x^i$ plus an increment $\Delta V_x^i$ which is directly proportional to the difference between $E_s^i$ and $V_x^i$, or in other words that:

$$V_x^{i+1}=V_x^i+\Delta V_x^i=V_x^i+k(E_s^i-V_x^i) \qquad (8)$$

where $k$ is some fixed constant.

What must be shown therefore is that:

$$\Delta V_x^i=k(E_s^i-V_x^i) \qquad (9)$$

In proving that Eq. 9 is correct, use may be made of the previously developed Eq. 7c which defined the charge increment $\Delta Q_a$ delivered to capacitor $C_a$ when standard capacitor $C_s$ (charged by a difunction signal to a standard voltage $E_s$ and charge $Q_s$) was shunted across capacitor $C_a$.

$$\Delta Q_a=\left(\frac{C_a}{C_a+C_s}\right)Q_s-\left(\frac{C_s}{C_a+C_s}\right)Q_a \qquad (7c)$$

In accordance with Eq. 7c, the equation defining the charge increment $\Delta Q_x^i$ delivered to capacitor $C_x$ when standard capacitor $C_{SO}$ (charged by a difunction signal to a standard voltage $E^i_{SO}$ and charge $Q^i_{SO}$) is shunted across capacitor $C_x$ is:

$$\Delta Q_x^i=\left(\frac{C_x}{C_x+C_{SO}}\right)Q^i_{SO}-\left(\frac{C_{SO}}{C_x+C_{SO}}\right)Q_x \qquad (10)$$

In developing Eq. 7c, it was pointed out that the term $$\left(\frac{C_s}{C_a+C_s}\right)Q_a$$

could be substantially disregarded, because of the fact that, by reason of the intrinsic feedback operation of input converter 3, each charge increment $\Delta Q_a$ is fed back in such sense as to reduce $Q_a$ to zero and thus render the term vanishingly small. In considering Eq. 10 however, since there is no such feedback process involved in the transfer of charge increments to capacitor $C_x$, it is clear that the charge $Q_x$ may attain large values, and therefore the term $$\left(\frac{C_{SO}}{C_x+C_{SO}}\right)Q_x$$

is of great importance and may not be omitted from Eq. 10.

Operating therefore upon both terms of Eq. 10, since $$\Delta V_x^i=\frac{\Delta Q_i}{C_x}$$

Eq. 10 may be rewritten in the form:

$$\Delta V_x^i=\frac{Q_x^i}{C_x}=\left(\frac{1}{C_x+C_{SO}}\right)Q^i_{SO}-\left(\frac{C_{SO}}{C_x+C_{SO}}\right)\frac{Q_x^i}{C_x} \qquad (11)$$

By multiplying the first term of Eq. 11 by $$\frac{C_{SO}}{C_{SO}}=1$$

there is obtained:

$$\Delta V_x^i=\left(\frac{C_{SO}}{C_x+C_{SO}}\right)\frac{Q^i_{SO}}{C_{SO}}-\left(\frac{C_{SO}}{C_x+C_{SO}}\right)\frac{Q_x^i}{C_x} \qquad (12)$$

Noting that $$\frac{Q_s^i}{C_{SO}}=E_s^i$$

and that $$\frac{Q_x^i}{C_x}=V_x^i$$

and factoring, Eq. 12 is reduced to the following form:

$$\Delta V_x^i=\frac{C_{SO}}{C_x+C_{SO}}(E_s^i-V_x^i) \qquad (13)$$

Since the quantity $$\frac{C_{SO}}{C_x+C_{SO}}$$

is constant it may be defined as a constant $k$, thus obtaining Eq. 9:

$$\Delta V_x^i=k(E_s^i-V_x^i \qquad (9)$$

where $k=$ $$\frac{C_{SO}}{C_x+C_{SO}}$$

Thus it is proved that each voltage increment delivered to capacitor $C_x$, by applied difunction signals, is proportional to the difference between the voltage level $E_s^i$ of the difunction signal and the voltage $V_x^i$ on capacitor $C_x$, and therefore the voltage $V_x$ developed across capacitor $C_x$ represents the average or filtered value of the successive difunction signals. The size of the constant $$\frac{C_{SO}}{C_x+C_{SO}}$$

will determine the amount of smoothing or filtering action provided, a relatively smooth output signal $V_x$ being obtained when capacitor $C_{SO}$ is relatively small compared to output capacitor $C_x$, the amount of smoothing which can be provided being limited of course by the speed of response required. It is clear that difunction signals applied in the same manner to the other output capacitors will be similarly averaged.

Considering now in detail the specific structure and operation of the preferred embodiment of output converter 4 shown in the figure, although various independent forms of commutators may be employed in converter 4 for accomplishing the above, commutator C is herein illustrated as a conventional brush-segment commutator similar to each of the commutator sections A and B of commutator 22 of multiple-input converter 3 in that the commutator C includes eight electrically-insulated commutator segments 1s to 8s, inclusive, and a single commutator brush 45. Since timing signals $t_p$ are utilized herein to demark each difunction signal interval, it is herein assumed that commutator brush 45 is rotated in a counterclockwise direction, as indicated by the arrow, in synchronism with and at the same angular velocity as sections A and B of commutator 22 of input converter 3. In fact, for purposes of illustration, commutator C may be considered as an additional section C of commutator 22 of converter 3.

Applied signals of the difunction signal series $D_{w1}$, $D_{x1}$, $D_{y1}$, $D_{z1}$, $D_{w2}$, $D_{x2}$, $D_{y2}$, $D_{z2}$ . . . $D_{wn}$, $D_{xn}$, $D_{yn}$, $D_{zn}$ are impressed on the commutator segments $2_s$, $4_s$, $6_s$, and $8_s$ which are commonly interconnected electrically as illustrated. Commutator segments $1_s$, $3_s$, $5_s$, and $7_s$ are coupled, respectively, to the upper terminals of output capacitors $C_w$, $C_x$, $C_y$ and $C_z$ through respective resistors $R_w$, $R_x$, $R_y$ and $R_z$ of averaging circuits 41, 42, 43 and 44, respectively. Commutator brush 45 is directly connected to the upper terminal of standard capacitor $C_{SO}$, the lower terminal of capacitor $C_{SO}$ together with the lower terminal of averaging capacitors $C_w$, $C_x$, $C_y$ and $C_z$ being connected to ground.

Consider now the sequence of operations of commutator C as commutator brush 45 rotates. Since it is assumed that the rotation of brush 45 is synchronized with the rotation of brushes 34, 36 of sections A, B of commutator 22, it is clear that brush 45 will rotate one-fourth of a revolution during the time interval between each successive timing signal $t_p$. As before, it is convenient to assume that the 1st, 2nd, 3rd, 4th, 5th, 6th, 7th, 8th . . . $(n-3)$rd, $(n-2)$nd, $(n-1)$st and $n$th difunction signals of difunction signal series $D_{w1}$, $D_{x1}$, $D_{y1}$, $D_{z1}$, $D_{x2}$, $D_{y2}$, $D_{z2}$ . . . $D_{wn}$, $D_{xn}$, $D_{yn}$, $D_{zn}$ are received by the converter during the respective 1st, 2nd, 3rd, 4th, 5th, 6th, 7th, 8th . . . $(n-3)$rd, $(n-2)$nd, $(n-1)$st, $n$th difunction signal intervals demarked with respect to time by timing signals $t_{p1}$, $t_{p2}$, $t_{p3}$, $t_{p4}$, $t_{p5}$, $t_{p6}$, $t_{p7}$, $t_{p8}$ . . . $t_{p(n-3)}$, $t_{p(n-2)}$, $t_{p(n-1)}$, $t_{pn}$, respectively, where the beginning of the first difunction signal interval (beginning of the observed operational period of the converter) is marked by timing signal $t_{p0}$.

Let it be further assumed, as before, that brush 45 is in position 1s—2s, at time $t_{p0}$, as illustrated. Thus at all times $t_{p(4R)}$, $t_{p(4R+1)}$, $t_{p(4R+2)}$, and $t_{p(4R+3)}$, brush 45 will be in positions 1s—2s, 3s—4s, 5s—6s, and 7s—8s, respectively, as indicated by radial dotted lines identified by arrows in the figure where R as before indicates the number of completed revolutions of the commutator brush from time $t_{p0}$.

Each time commutator brush 45 contacts one of the segments 2s, 4s, 6s, 8s, the difunction signal then received by the converter is impressed on capacitor $C_{s0}$ thereby charging the capacitor to a charge $Q_{s0}$ and voltage $E_{s0}$ representative of the value of the difunction signal received. Each time commutator brush 45 contacts one of the segments 1s, 3s, 5s, 7s, on the other hand, capacitor $C_{s0}$ is isolated from the applied difunction signals and is shunted with a corresponding one of the averaging capacitors $C_w$, $C_x$, $C_y$, $C_z$.

Consider for example the operation of commutator C during the 1st difunction signal interval at which time difunction signal $D_{w1}$ is impressed on converter 3. When brush 45 contacts segment 2s, signal $D_{w1}$ is applied to capacitor $C_{s0}$ thereby charging the capacitor to a charge $Q'_{s0}$ and voltage $E'_s$ representative of the value of difunction signal $D_{w1}$. When brush 45 arrives at the position 2s—3s, capacitor $C_{s0}$ is isolated from the remainder of the circuitry but retains therein the voltage and charge representing signal $D_{w1}$. Subsequently when brush 45 contacts segment 3s, capacitor $C_{s0}$ is shunted with averaging capacitor $C_w$ thereby transferring a charge increment $\Delta Q_w^1$ to capacitor $C_w$. As a consequence, a voltage increment $\Delta V_w^1$ representative of this charge is developed across the averaging capacitor. It will be understood that in response to a succession of such transfers a voltage $V_w$ will be developed across the $C_w$ capacitor which will represent the average value of the signals $D_{w1}$, $D_{w2}$, $D_{w3}$ . . . $D_{wn}$ of the corresponding difunction signal train.

During the ensuing 2nd difunction signal interval, when brush 45 travels from position 3s—4s to position 5s—6s, the same sequence of events as above occurs for charging capacitors $C_{s0}$ to a charge and voltage representative of difunction signal $D_{x1}$ received during the period and subsequently applying this voltage and transferring this charge to capacitor $C_x$ as the two capacitors are shunted together. This process is repeated during each of the two subsequent difunction signal intervals of the first revolution of brush 45, charging capacitor $C_{s0}$ with a charge representing difunction signal $D_{y1}$ which is transferred to capacitor $C_y$ and subsequently charging capacitor $C_{s0}$ with a charge representative of signal $D_{z1}$ which is transferred to capacitor $C_z$.

In response to successive repetitions of these described operations, each of the capacitors $C_w$, $C_x$, $C_y$ and $C_z$ will become charged to voltage levels $V_w$, $V_x$, $V_y$ and $V_z$, respectively, which are representative of the filtered or averaged value of the corresponding difunction signal train. The voltage $V_w$ as hereinbefore described will represent the average value of the signals $D_{w1}$, $D_{w2}$ . . . $D_{wn}$; the voltage $V_x$ will represent the average value of the signals $D_{x1}$, $D_{x2}$ . . . $D_{xn}$; the voltage $V_y$ will represent the average value of the signals $D_{y1}$, $D_{y2}$ . . . $D_{yn}$ and the voltage $V_z$ will represent the average value of the signals $D_{z1}$, $D_{z2}$ . . . $D_{zn}$.

Typical values for the circuit components of multiple-output converter 4 are listed below as illustrative only and not as limiting in any way the wide choice of possible circuit component values satisfying the heretofore discussed requirements of the converter.

$C_{s0}$=0.1 mfd.
$C_w$, $C_x$, $C_y$, $C_z$=70 mfd's each
$R_w$, $R_x$, $R_y$, $R_z$=1,000 ohms each It is noted from the figure, that analog output signals $V_w$, $V_x$, $V_y$ and $V_z$ of converter 4 are applied, respectively, to utilization devices 11, 12, 13 and 14. By way of example only, utilization device 11 is illustrated in more detail as a demonstration of the manner in which a servo-controlled utilization device may be employed in conjunction with the multiple-input system of the present invention.

Utilization device 11 includes a motor control circuit 49, a motor 53, a pair of meshed reduction gears 54 and 55, a potentiometer 56, and a utilization element 47. Signals $V_w$ are directly applied to motor control circuit 49 which in response thereto produces motor control signals on leads 51 and 52 for driving motor 53, to which they are applied, the polarity and magnitude of the motor control signal depending upon the sense and magnitude, respectively, of signal $V_w$ as compared to a predetermined reference potential, as for example, zero or ground potential. The motor control signals are applied to motor 53 which in response thereto rotates in a direction and at a velocity corresponding, respectively, to the polarity and magnitude of the motor control signals. Rotation of motor 53 results in a corresponding rotation of gear 54 affixed to the shaft thereof. As gear 54 is rotated, there results a corresponding reduced-spaced rotation of a working shaft 48 affixed to the center hub of meshed gear 55. The rotation of shaft 48 activates the utilization device 47 which is coupled to the shaft and operated thereby. The slider (not shown) of potentiometer 56 is also affixed to shaft 48 and is rotated thereby. A B+ and a B− potential is respectively applied to the two extremities of the resistance winding (not shown) of the potentiometer 56. Lead 57 is connected from the slider of the potentiometer 56 to the outside of utilization device 11 as illustrated, the magnitude and sense of the voltage appearing on lead 57 representing the relative position of shaft 48 at all times.

The are two basic modes whereby utilization device 11 may be incorporated with the remaining circuitry of the figure in order to operate as a servo-controlled shaft-positioning device.

In accordance with the first mode of operation, the voltage signals appearing on lead 57 are introduced as applied analog voltage $V_a$ of converter 3. Thus the voltage signals produced by potentiometer 56 and representing the instantaneous position of shaft 48 of the ultization device are converted by multiple-input converter 3 to a corresponding equivalent difunction signal train $D_{a1}$, $D_{a2}$ . . . $D_{an}$ which is applied to computer 2. In this mode of operation, it is assumed that from the other applied signals analog voltages $V_b$, $V_c$, and $V_d$, a desired or correct position for shaft 48 can be computed by computer 2, which then compares the information describing the desired position of shaft 48 with signals $D_1$, $D_{a2}$ . . . $D_{an}$ defining the actual present position of the shaft. As a result of this comparison, computer 2 causes a correction difunction signal train $D_{w1}$, $D_{w2}$ . . . $D_{wn}$ to be produced which is impressed on multiple-output converter 4, the above signal train being an error train having an average value corresponding to the direction and magnitude of that change of position which shaft 48 must undergo to arrive at the desired position. Output converter 4 functions to convert this signal train to the equivalent analog signal $V_w$ which is impressed on utilization device 11 to cause shaft 48 to be rotated in the corresponding correct direction. The above process is repeated until the difunction signal train produced by converter 3 from the feedback signals appearing on lead 57 corresponds in value to the desired-position as developed by the computer. When this occurs, computer 2 causes an output signal train having an average value of zero to be impressed on output converter 4. As a consequence, signal $V_w$ becomes zero and shaft 48 of utilization device 11 accordingly stays at rest.

It will be noted in Fig. 1 that a switch 59 is located immediately below computer 2 and interconnected with the output converter 3 and with the input of converter 4 so that when the switch is closed the input difunction signals $D_{a1}$, $D_{b1}$, $D_{c1}$, $D_{d1}$, $D_{a2}$, $D_{b2}$, $D_{c2}$, $D_{d2}$ . . . $D_{an}$, $D_{bn}$, $D_{cn}$, $D_{dn}$, produced by input converted 3 are shunted around the computer to serve as the respective difunction signals $D_{w1}$, $D_{x1}$, $D_{y1}$, $D_{z1}$, $D_{w2}$, $D_{x2}$, $D_{y2}$, $D_{z2}$ . . . $D_{wn}$, $D_{xn}$, $D_{yn}$, $D_{zn}$ received by multiple-output converter 4.

In accordance with the second mode of servo operation of utilization device 11; switch 59 is maintained closed, and the feedback signals appearing on lead 57 of the utilization device are applied to an additional input lead (also labeled 57) of input converter 3 and are fed through a resistor 61 to the upper terminal of integrating capacitor $C_a$ of integrator 25. Resistor 61 is the same value as resistor $R_a$ of integrator 25 so that integrator 25 in effect integrates both the analog signal $V_a$ and the analog feedback signals from utilization device 11.

In accordance with this latter mode of operation, applied analog signals $V_a$ dictate the final desired position of shaft 48 of utilization device 11. In other words, it is desired to position shaft 48 in accordance with the value of applied analog signal $V_a$. Since both the feedback signals (reversed polarity) and applied analog signal $V_a$ are simultaneously applied to integrator 25, the difunction output signal train $D_{a1}$, $D_{a2}$ . . . $D_{an}$ of input converter 3 has an average value representing at all times the difference between the actual and desired positions of shaft 48. Since these signals are by-passed around computer 2 through switch 59, these signals correspond to the difunction input signal train $D_{w1}$, $D_{w2}$ . . . $D_{wn}$ of output converter 4. This difunction input signal train, interplexed with difunction signal trains $D_{x1}$, $D_{x2}$ . . . $D_{xn}$; $D_{y1}$, $D_{y2}$ . . . $D_{tn}$; and $D_{z1}$, $D_{z2}$ . . . $D_{zn}$, is applied to output converter 4 which separates the interplexed train to form analog signals $V_w$, $V_x$, $V_y$, aud $V_z$. Signal $V_w$, corresponding to the average value of difunction signal train $D_{w1}$, $D_{w2}$ . . . $D_{wn}$, is applied to utilization device 11 causing shaft 48 thereof to rotate in the correct direction to reduce the difference between the value of the feedback signal voltage and applied analog voltage $V_a$. When this difference is zero, i.e. shaft 48 is in the desired position, input converter 3 will, it is clear, produce a difunction signal train $D_{a1}$, $D_{a2}$ . . . $D_{an}$ having an average value of zero. As a consequence, analog output signal $V_a$ of output converter 4 will have a corresponding zero value and shaft 48 will be permitted to remain in the attained, desired position.

From the preceding analysis of the averaging or filtering effect of the output circuits, it is clear that if capacitor $C_w$ is provided considerably reduced in size or if a comparatively rapid discharge path through motor control circuit 49 is provided for capacitor $C_w$ of output converter 4, the difunction signals $D_{w1}$, $D_{w2}$ . . . $D_{wn}$, will appear as discrete independent relatively unfiltered signals impressed on capacitor $C_w$. In this case, motor control 49 may include a motor-relay operable in response to each difunction signal impressed thereon to direct energy to motor 53 having first and second polarities in response, respectively, to first and second-valued difunction signals. Thus motor 53 is caused to rotate clockwise and counterclockwise respectively in response to first and second-valued difunction signals applied to motor control 49. As a consequence, ultization device 11 may in this mode of operation be made operable in conjunction with remaining circuitry of Fig. 1 as a "bang-bang" or "full forward-full reverse" servo in accordance with either of the two previously described modes.

What is claimed as new is:

1. In an information handling system, a multiple-input sampling circuit for successively sampling a plurality of input voltage signals developed across a corresponding mutually independent plurality of charged input capacitors to produce a series of corresponding output sampling signals, each output sampling signal representing the value of a corresponding one of the plurality of input voltage signals; said sampling circuit comprising: an output capacitor and commutating means coupled between the plurality of charged input capacitors and said output capacitor for successively connecting each capacitor of the plurality of charged input capacitors to said output capacitor for a predetermined time interval of sufficient duration to establish charge-equilibrium between the connected capacitors to thereby successively develop the output sampling signals across said output capacitor, whereby the magnitude of said output sampling signals is independent of any variations in impedance of the connections between said input capacitors and said output capacitor.

2. In an information handling system, a multiple-input sampling circuit for producing a series of sampling signals each representing a corresponding one of a plurality of input quantities, said sampling circuit comprising: a corresponding plurality of mutually independent input capacitors; charging means for charging each of said input capacitors with a charge representative of the corresponding input quantity; a sampling capacitor; a commutator coupled between said plurality of input capacitors and said sampling capacitor for successively shunting each of said input capacitors with said sampling capacitor for sufficient time for charge-equilibrium to be established between the shunted capacitors to form the successive sampling signals across said sampling capacitor, whereby the voltage magnitude of said sampling signals is unaffected by any variation in impedance of the connections made through said commutator and of variations in the duration of each connection; and means connected to said sampling capacitor and responsive to said sampling signals to produce bivalued, information representing signals corresponding to a mathematical function of the magnitudes of the input quantities.

3. The multiple-input sampling circuit defined by claim 2 wherein the voltage magnitude of each of said series of sampling signals is representative of the integral of a corresponding one of said input quantities, said charging means including signal generation apparatus for generating a plurality of input signals having voltage magnitudes corresponding respectively to said plurality of input quantities, and a corresponding plurality of resistors for applying each of said input signals to the corresponding input capacitor to charge each input capacitor at a rate proportional to the voltage magnitude of the corresponding input signal, whereby the charge in each input capacitor is representative of the integral of the corresponding input signal.

4. In an information handling system, a multiple-input sampling circuit for successively sampling a plurality of simultaneously applied input signals to produce a series of corresponding sampling signals, each sampling signal representing the magnitude of a corresponding one of the plurality of applied input signals; said sampling circuit comprising: an input circuit including a plurality of mutually independent input capacitors and charging apparatus responsive to the plurality of applied input signals for charging each of said input capacitors with a charge representing the magnitude of a corresponding one of said input signals; a sampling capacitor; a commutator coupled between said input circuit and said sampling capacitor for successively shunting each of said input capacitors with said sampling capacitor for a predetermined time interval of sufficient duration for charge-equilibrium to be established between the shunted capacitors to thereby develop the corresponding successive sampling signals across said sampling capacitor, whereby the magnitude of said sampling signals is unaffected by any variations in impedance of the connections made through said commutator and of variations in the duration of each connection; and means connected to said sampling capacitor for connecting said sampling signals into a plurality of bivalued signal trains, each representing a mathematical function of the magnitude of an applied input signal.

5. A multiple-input converter for converting a plurality of simultaneously applied analog signals to a corresponding plurality of interplexed difunction signal trains, said converter comprising: an integrating circuit responsive to the plurality of applied analog signals for simultaneously producing a corresponding plurality of integral signals, each of said integral signals representing the integral with respect to time of a corresponding one of the applied analog signals; a sampling capacitor; first means coupled between said integrating circuit and said sampling capacitor for successively applying each of said plurality of integral signal capacitor to successively charge said sampling capacitor by said integral signals to develop a corresponding plurality of sampling signals across said sampling capacitor, the magnitude of each of said sampling signals representing the value of a corresponding one of said integral signals; a sensing element coupled to said sampling capacitor and responsive to each sampling signal for producing a corresponding difunction output signal, the successive difunction output signals thereby produced comprising the interplexed difunction signal trains, a feedback capacitor; second means coupled to said sensing element and said feedback capacitor and responsive to each of said difunction output signals for developing a corresponding feedback charge in said feedback capacitor representative of the value of the difunction output signal; and third means intercoupling said feedback capacitor and said integrating circuit and responsive to each feedback charge for reducing the value of a corresponding one of said integral signals in accordance with the magnitude of said feedback charge.

6. The multiple-input converter defined in claim 5 wherein said integrating circuit includes a plurality of resistor-capacitor integrators corresponding respectively to said plurality of analog signals, each integrator comprising an integrating capacitor and an input impedance element responsive to the corresponding analog signal for applying a current representative of the analog signal to said integrating capacitor, whereby an integral signal representative of the integral of the applied current is developed across said integrating capacitor.

7. The multiple-input converter as defined by claim 6 wherein said first means comprises an input commutator for successively connecting each of said integrating capacitors to said sampling capacitor for a sufficient time interval for charge-equilibrium to be established between said capacitor.

8. The multiple-input converter defined by claim 7 wherein said sampling capacitor is relatively small in comparison to each of said integrating capacitors.

9. The multiple-input converter defined by claim 7 wherein said input commutator includes apparatus for discharging said sampling capacitor in the time interval between each successive connection of said integrating capacitors to said sampling capacitor.

10. The multiple input converter defined by claim 6 wherein said third means comprises a commutator operable after each feedback charge has been developed in said feedback capacitor for connecting said feedback capacitor to the corresponding integrating capacitor for a sufficient time interval for charge-equilibrium to be established between the feedback capacitor and the integrating capacitor, whereby the charge in said integrating capacitor is substantially diminished by a charge decrement representative of the corresponding difunction output signal.

11. The multiple-input converter defined by claim 10 wherein said feedback capacitor is relatively small in comparison to each of said integrating capacitors.

12. A multiple-input converter for converting a plurality of applied analog voltage signals developed across a corresponding plurality of charged input capacitors to a corresponding plurality of equivalent digital signal trains, said converter cyclically producing a series of digital output signals, a digital signal of each digital signal train being included in each series; said converter comprising: a sampling capacitor; first means coupled between the plurality of input capacitors and said sampling capacitor for successively connecting each of the input capacitors to said sampling capacitor for a predetermined timing interval of sufficient duration to establish charge-equilibrium between the connected capacitors to successively develop a corresponding plurality of sampling signals across said sampling capacitors, each of said sampling signals representing the value of a corresponding one of said integral signals; a digital signal generator coupled to said sampling capacitor and responsive to each sampling signal for generating a corresponding digital output signal, the successive digital output signals thereby generated comprising the desired series of digital output signals; a feedback capacitor; second means coupled between said digital signal generator and said feedback capacitor and responsive to each of said digital output signals for developing a corresponding feedback charge in said feedback capacitor representative of the value of the digital output signal; and third means coupled between said feedback capacitor and the plurality of charged input capacitors for transferring each of said feedback charges to a corresponding one of the input capacitors, said third means being operable for successively connecting said feedback capacitor to each input capacitor for a sufficient time interval to establish charge-equilibrium between the connected capacitors, thereby reducing the charge in each input capacitor in accordance with the value of a corresponding one of said feedback charges.

13. In an information handling system, a signal transfer circuit for receiving a plurality of sequentially applied input signals on an input terminal and for producing in response thereto a plurality of equivalent output signals on a corresponding plurality of separate output terminals, each output signal representing the value of a corresponding one of the applied input signals; said signal transfer circuit comprising: an input capacitor; first means coupled between the input terminal and said input capacitor and responsive to the sequentially applied input signals for sequentially developing a corresponding plurality of signal charges in said input capacitor, each of said signal charges representing the value of a corresponding one of the applied input signals; an output circuit including a plurality of mutually independent output capacitors, corresponding respectively to the plurality of applied input signals, each of said output capacitors being connected to a corresponding one of the plurality of separate output terminals; and second means intercoupling said input capacitor and said output circuit for sequentially connecting said input capacitor to each of said output capacitors for a predetermined time interval of sufficient duration to establish charge-equilibrium between the connected capacitors, thereby successively developing the desired plurality of equivalent output signals on the corresponding plurality of separate output terminals.

14. In an information handling system, a multiple-output converter for receiving a series of difunction signals composed of a plurality of interplexed difunction signal trains, and producing a corresponding plurality of analog output signals each representing the average value of the signals of a corresponding one of the difunction signal trains; said converter comprising: an input capacitor; first means coupled to said input capacitor and responsive to each difunction signal for developing a corresponding signal charge in said input capacitor; an output circuit including a plurality of mutually independent output capacitors corresponding respectively to the plurality of difunction signal trains; second means coupled between said input capacitor and said output circuit and operable after each charging of said input capacitor for connecting said input capacitor to a corresponding one of said output capacitors for a sufficient period of time to establish charge-equilibrium between said input capacitor and the output capacitor, thereby transferring to said output capacitor the signal charge previously developed in said input capacitor whereby the desired plurality of analog output signals are respectively developed across said plurality of output capacitors in response to successive charge transfers thereto.

15. The multiple-output converter defined by claim 14 wherein said second means comprises an output commutator for successively conductively connecting said input capacitor to each of said plurality of output capacitors for a sufficient period of time to establish charge-equilibrium between the connected capacitors.

16. The multiple- input converter defined by claim 14 wherein the capacitance of said input capacitor is relatively small compared to the capacitance of each of said output capacitors.

17. A signal separation circuit for receiving a series of N input signals occurring during N corresponding predetermined signal periods and for producing in response thereto N separate output signals on N separate output terminals, respectively, the magnitude of each of the N output signals accurately representing the magnitude of a corresponding one of the N input signals, said signal separation circuit comprising: an input capacitor having a first and a second terminal; an output circuit including N mutually independent output capacitors, each of said output capacitors having a first and a second terminal, the first terminal of each of said N output capacitors being commonly coupled to the first terminal of said input capacitor and the second terminal of each of said N output capacitors being connected to a different one of the N output terminals, respectively; and a commutator intercoupling said input circuit and said output circuit, said commutator including an input terminal, 2N successive commutator segments, and a single commutator brush, the first alternate N segments of said 2N commutator segments being connected, respectively, to the second terminals of said N output capacitors, the second alternate N segments of said 2N commutator segments being commonly connected to said input terminal, and said commutator brush being connected to the second terminal of said input capacitor, said commutator being operative to successively make and break electrical contact with each of said 2N successive commutator segments, said commutator brush making successive electrical contact with one of said first alternate segments during each of the predetermined signal periods; and means coupled to said commutator for applying the series of N input signals to said input terminal.

18. A multiple-input sampling circuit for successively sampling N simultaneously applied input signals to produce a series of N corresponding sampling signals, each sampling signal accurately representing the magnitude of a corresponding one of the N applied input signals; said sampling circuit comprising: an input circuit including N mutually independent input capacitors, each of said N input capacitors having a first and a second terminal; means coupled to said input circuit and responsive to the N applied input signals for charging each of said N input capacitors with a charge representing the value of a corresponding one of the N applied input signals to cause the respective charges of said N input capacitors to represent the magnitudes, respectively, of the N applied input signals; an output capacitor coupled to said input circuit, said output capacitor having a first and a second terminal, the first terminal of said output capacitor being commonly coupled to the first terminal of each of said N input capacitors; and a commutator coupled to said input circuit and said output capacitor, said commutator including 2N commutator segments and a single commutator brush, the first alternate N segments of said 2N commutator segments being connected, respectively, to the second terminals of said N input capacitors, the second alternate N segments of said 2N commutator segments being commonly connected to the first terminal of said output capacitor, and said commutator brush being connected to the second terminal of said output capacitor, said commutator being operable to cause said commutator brush to successively make and break electrical contact with each of said 2N commutator segments thereby causing said output capacitor to be successively charged between each of said N charge transfers, the N desired output signals being thus developed as successive voltage signals across said output capacitor.

19. In a multiple-input multiple-output system for converting a plurality of simultaneously applied analog input signals, including an analog feedback signal representing the position of a moveable element, to a corresponding plurality of interplexed equivalent input difunction signal trains including a feedback signal train corresponding to said said analog feedback signal for application as the input information of an associated computer, and for converting a series of interplexed output difunction signal trains produced by the computer, including an error signal train representing the positional deviation of the moveable element from a desired position, to a corresponding plurality of separate difunction output signal trains, a difunction signal servo for positioning the moveable element at the desired position; said signal servo including: a first capacitor; first means coupled to said first capacitor and responsive to the signals of the series of interplexed output difunction signal trains for successively applying the successive difunction signals of said error signal train to said first capacitor to develop corresponding successive error changes therein; a second capacitor; second means coupled between said first and second capacitors for sequentially and cyclically connecting and disconnecting said first capacitor to said second capacitor to apply each signal of the error signal train to said second capacitor; actuating means coupled to said second capacitor and the moveable element and responsive to each error signal transferred to said second capacitor for displacing the moveable element in accordance with the value of the error signal, a position indicator coupled to the moveable element for producing the analog feedback signal; and a commutated analog-to-difunction converter responsive to the simultaneously applied analog input signals for producing corresponding interplexed input difunction signal trains, including the feedback signal train.

20. The difunction servo defined by claim 19 wherein said second means includes filtering apparatus for filtering the applied signals of the error signal train to produce a corresponding analog output signal, the magnitude of said analog output signal being proportional to the average value of the signals of the error signal train, said actuating means including displacing apparatus for displacing said moveable element in accordance with the magnitude of said analog output signal.

21. The difunction signal servo defined in claim 19 wherein said commutated difunction converter includes a third capacitor coupled to said position indicator and responsive to the analog signal for developing a feedback charge therein; a fourth capacitor; means coupled to said third and fourth capacitors for successively connecting and disconnecting said third capacitor to said fourth capacitor, each connection being maintained for a sufficient time interval to establish charge-equilibrium between said capacitors thereby to develop a series of sampling signals across said fourth capacitor representative of the value of the feedback analog signal; and a difunction sensing circuit coupled to said fourth capacitor and responsive to said series of sampling signals for producing the feedback signal train.

22. The difunction servo defined by claim 19 wherein said second means includes a commutator, intercoupling said first and second capacitors, for sequentially and cyclically connecting said first capacitor to said second capacitor, each connection being made for a sufficiently long time interval to establish charge-equilibrium between said capacitors.

23. The difunction servo defined by claim 22 wherein said first capacitor has a relatively small capacitance with respect to the capacitance of said second capacitor.

24. In a multiple-input multiple-output system for converting a plurality of applied analog signals, including a feedback analog signal representing the position of a moveable element, to a corresponding plurality of interplexed input digital signal trains for application as the input information of an associated computer, and for converting a series of resultant interplexed digital signal trains produced by said computer, including an error signal train representing the positional deviation of the moveable element from a desired position, to a corresponding plurality of equivalent analog output signals; a positional servo for positioning said moveable element, said positional servo including: first means responsive to the error signal train for converting the error signal train to a servo analog signal, said servo analog signal, representing the value of the error signal train and representing one of the plurality of equivalent analog output signals; an actuator intercoupling said first means and the moveable element and responsive to said servo analog signal for moving the moveable element in accordance with the value of said servo analog signal; a position indicator coupled to the moveable element for producing the feedback analog signal; an input capacitor; second means intercoupling said position indicator and said input capacitor and responsive to each feedback analog signal for charging said input capacitor to a feedback charge representative of the value of the feedback analog signal; a sampling capacitor; third means coupled between said input and sampling capacitors for successively and cyclically connecting said input capacitor to said sampling capacitor for predetermined timing periods, said input and sampling capacitors being connected together during each of said predetermined timing periods for a sufficient time to establish charge-equilibrium between the connected capacitors to successively develop a series of sampling signals across said sampling capacitor representing the value of the feedback analog signal; fourth means coupled to said sampling capacitor and responsive to each of said sampling signals for developing a corresponding digital feedback signal, the successive digital feedback signals thereby generated comprising feedback signal train representing one of the interplexed input digital signal trains.

25. The positional servo defined in claim 24 wherein said first means includes a first capacitor; charging means coupled to said first capacitor and responsive to the signals of said error signal train for impressing each of said signals on said first capacitor to successively develop corresponding charging signals in said first capacitor; a second capacitor; and second means coupled between first and second capacitors for successively connecting said first capacitor to said second capacitor to apply each of said charging signals to said second capacitor, each connection being made for sufficiently long time intervals to establish charge-equilibrium between said capacitors thereby developing said servo analog output signals across said second capacitor.

26. In a multiple-input multiple-output system for converting a plurality of applied analog signals, including a feedback analog signal representing the position of a moveable element, to corresponding difunction signal trains for application as the input information of an associated computer, and for converting a series of resultant interplexed difunction signal trains produced by said computer, including an error signal train representing the positional deviation of the moveable element from a desired position, to a corresponding plurality of equivalent analog output signals, a positional servo for positioning said moveable element; said positional servo including: a first capacitor; first means coupled to said first capacitor and operable for successively impressing each signal of said error signal train on said first capacitor to successively develop therein corresponding error charges; a second capacitor; second means coupled between said first and second capacitors for successively applying each of said error charges to said second capacitor; said second means including apparatus for sequentially connecting and disconnecting said first capacitor to said second capacitor, each connection being made for sufficiently long time intervals to establish charge-equilibrium between said capacitors thereby developing a servo analog signal across said second capacitor representing the value of said error signal train; a positioning motor coupled to said second capacitor and the moveable element and responsive to said servo analog signal for moving the moveable element in accordance with the value of said servo analog signal; a position indicator coupled to the moveable element for producing the feedback analog signal having a value representative of the position of the moveable element; a third capacitor; third means coupled to said position indicator and said third capacitor and responsive to the feedback analog signal for charging said third capacitor to a feedback charge representative of the value of the feedback analog signal; a fourth capacitor; fourth means coupled between said third and fourth capacitors for successively and cyclically connecting and disconnecting said third capacitor to said fourth capacitor each connection being made for a sufficient time to establish charge-equilibrium between the connected capacitors to successively develop a series of sampling signals across said fourth capacitor representing the value of the feedback analog signal; and a difunction signal generator coupled to said fourth capacitor and responsive to each of said sampling signals for developing a corresponding feedback difunction signal, the successive feedback difunction signals thereby generated comprising one of the difunction signal trains.

27. The positional servo defined in claim 26 wherein said difunction signal generator includes; a sensing element coupled to said fourth capacitor and responsive to said sampling signals for generating said feedback signal train; a fifth capacitor coupled to said sensing element and responsive to successive difunction signals of said feedback signal train for successively developing corresponding difunction charges therein; and fifth means coupled to said third and fifth capacitors for successively and cyclically connecting and disconnecting said fifth capacitor to said third capacitor, each connection being made for a sufficient time interval to establish charge-equilibrium between said capacitors thereby successively transferring each of said difunction charges from said fifth capacitor to said third capacitor to reduce the feedback charge in said third capacitor by an amount representative of a corresponding one of the signals of said feedback signal train during each transfer.

28. In a multiple-input multiple-output system responsive to a plurality of applied analog input signals, including an analog positioning signal and an analog feedback signal, for producing a corresponding plurality of interplexed difunction output signal trains and for operating upon the plurality of interplexed output difunction signal trains to produce a plurality of resultant analog output signals, a positioning servo for accurately positioning a moveable element in accordance with the value of the analog positioning signal; said servo comprising: a position indicator coupled to the moveable element for producing the analog feedback signal, the magnitude of said analog feedback signal being representative of the position of the moveable element; a first capacitor; first means coupled to said first capacitor and responsive to the analog positioning signal and the analog feedback signal for developing a difference charge in said first capacitor representing the difference between the values of the analog positioning signal and the analog feedback signal; a second capacitor; second means coupled between said first and second capacitor for successively connecting said first capacitor to said second capacitor during successive predetermined first timing periods to successively develop difference sampling signals across said second capacitor, one sampling signal being developed during each of said predetermined first timing periods; a difunction signal generator coupled to said second capacitor and responsive to said difference signals for generating a difference signal train, said difference signal train being one of the plurality of interplexed difunction output signal trains, each difunction signal of said difference signal train being developed during a corresponding one of said predetermined first timing periods; a third capacitor coupled to said difunction signal generator and responsive to the signals of said difference signal train for developing a corresponding series of feedback charges therein, the successive feedback charges being developed during correspondingly successive predetermined second timing periods; third means coupled between said first and said third capacitors for successively connecting said third capacitor to said first capacitor during each of said predetermined second timing periods, said capacitors being connected together during each of said periods for a sufficient interval of time to establish charge-equilibrium therebetween to reduce said difference charge in said first capacitor by a charge proportional to the corresponding feedback charge; a fourth capacitor; fourth means coupled between said difunction signal generator and said fourth capacitor for applying the successive difunction signals of said difference signal train to said fourth capacitor for successively developing therein corresponding error signal charges, each of said error signal charges being developed during a corresponding one of said predetermined second timing periods and representing the value of a corresponding one of the signals of said difference signal train; a fifth capacitor; fifth means intercoupling said fourth and fifth capacitors and operable to successively connect said fourth capacitor to said fifth capacitor during each of said second predetermined timing period, said capacitors being connected during each of said timing periods for sufficient time to establish charge-equilibrium between said capacitors thereby developing a servo analog signal across said fifth capacitor, said servo analog signal representing one of the plurality of analog output signals; a positioning motor coupled to said fifth capacitor and the moveable element for positioning the moveable element in accordance with the value of said servo analog signal; and a position indicator coupled to the moveable element and responsive to the position thereof for producing the analog feedback signal having a value at all times representative of the position of the moveable element.

29. An analog-to-difunction, difunction-to-analog, input-output system, for producing input difunction signal trains for application to an associated computer and responsive to resultant output difunction signal trains produced by the computer for forming corresponding analog output signals, said input output system comprising: first means operable in response to a plurality of simultaneously applied analog input signals for producing a plurality of interplexed difunction input signal trains, the average value of the signals of each input signal train being proportional to the magnitude of predetermined analog input signals, said first means including; an integrating circuit responsive to the analog input signals for producing a plurality of integral signals, the magnitude of each integral signal being proportional to the integral of predetermined analog input signals; a sensing element responsive to applied integral signals for developing corresponding difunction input signals, each difunction input signal having either a predetermined first or second value in accordance with the magnitude of the correspondingly applied integral signal; an input commutator for successively sampling each of said integral signals and serially applying each sampled integral signal to said sensing element, said input commutator also being operable for receiving the corresponding difunction input signal produced by said sensing element and applying each difunction input signal to said integrating circuit to reduce the corresponding integral signal in accordance with the value of the difunction input signal; and signal applying apparatus for applying each difunction input signal to the computer; and second means operable in response to a plurality of resultant interplexed difunction output signal trains produced by the computer for producing a corresponding plurality of equivalent analog output signals, said second means including; a plurality of averaging circuits each averaging circuit being responsive to applied difunction signals for filtering these signals to produce an analog output signal representative of the average value of the applied difunction signals; and commutating apparatus operable for receiving the successive signals of the interplexed difunction output signal trains and for applying all the signals of each train to predetermined ones of said averaging circuits.

30. A multiple-input multiple-output system responsive to a plurality of applied analog input signals for sequentially producing a series of difunction input signals composed of a corresponding plurality of interplexed input difunction signal trains respectively representing the applied analog signals for application as the input information of an associated computer, and responsive to a recurring series of difunction signals produced by said computer and composed of a plurality of output difunction signal trains for producing a corresponding plurality of equivalent analog output signals; said system comprising: a multiple-input circuit including an integrating circuit responsive to the plurality of applied analog signals for producing a corresponding plurality of integral signals, each of said integral signals representing the integral with respect-to-time of a corresponding one of the applied analog signals; a sampling capacitor; first means coupled between said integrating circuit and said sampling capacitor for successively applying each of said plurality of integral signals to said sampling capacitor to successively charge said sampling capacitor to develop corresponding successive sampling signals across said sampling capacitor, the magnitude of each of said sampling signals representing the value of a corresponding one of said integral signals; a sensing element coupled to said sampling capacitor and responsive to each sampling signal for producing a corresponding difunction input signal, the successive difunction input signals thereby produced comprising the desired series of difunction input signals; a feedback capacitor; second means coupled to said sensing element and said feedback capacitor and responsive to each of said difunction output signals for developing a corresponding feedback charge in said feedback capacitor representative of the value of the difunction output signal; third means intercoupling said feedback capacitor and said integrating circuit and responsive to each feedback charge for reducing the value of a corresponding one of said integral signals in accordance with the magnitude of said feedback charge; fourth means for applying each of said difunction input signals to the computer; fifth means coupled to said input capacitor and responsive to each series of difunction signals produced by the computer for developing a corresponding series of signal charges in said input capacitor, each signal charge being developed during a predetermined timing interval and representing the value of a corresponding one of the signals of said series; an output circuit including a plurality of output capacitors, one output capacitor being included for each of the plurality of difunction signal trains; and sixth means coupled between said input capacitor and said output circuit and operable after each of said predetermined timing intervals to connect said input capacitor to a corresponding one of said output capacitors for a sufficient period of time to establish charge-equilibrium between said input capacitor and the output capacitor, thereby transferring to said output capacitor the signal charge developed in said input capacitor during the immediately preceding predetermined timing interval, whereby the desired plurality of analog output signals are respectively developed across said plurality of output capacitors in response to successive charge transfers thereto.

References Cited in the file of this patent

UNITED STATES PATENTS

| | | |
|---|---|---|
| 1,319,164 | Montelins | Oct. 21, 1919 |
| 2,006,582 | Callahan | July 2, 1935 |
| 2,430,265 | Weisglass | Nov. 4, 1947 |
| 2,631,249 | Smith | Mar. 10, 1953 |
| 2,741,756 | Stocker | Apr. 10, 1956 |

UNITED STATES PATENT OFFICE

CERTIFICATION OF CORRECTION

Patent No. 2,960,690 November 15, 1960

Daniel L. Curtis

It is hereby certified that error appears in the above numbered patent requiring correction and that the said Letters Patent should read as corrected below.

Column 1, lines 65 and 66, for "signal" read -- single --; column 5, line 9, for "techniqnes" read -- techniques --; line 19, after "brush-segment" strike out the comma; column 7, line 2, for "are" read -- is --; column 10, line 56, after "$E_2$" insert a comma; column 12, line 75, strike out "re-"; column 13, line 43, for "100" read -- 1000 --; column 14, line 50, for "$C_c$" read -- $V_c$ --; column 17, line 62, after "$D_{xn}$;" insert -- $D_{y1}$, $D_{y2}$ .....$D_{yn}$; --; column 18, line 18, for "analogy" read -- analog --; column 20, line 15, after equation (9), insert a closing parenthesis; line 25, for "average" read -- averaged --; column 21, line 5, after "$D_{z1}$," insert -- $D_{w2}$, --; line 17, for "$t_{p(4R\div2)}$," read -- $t_{p(4R+2)}$, --; same column 21, line 57, for "receved" read -- received --; column 22, line 11, for "mfd's" read -- mfds --; line 50, for "The" read -- There --; same column 22, line 67, for "$D_1$" read -- $D_{a1}$ --; column 23, line 17, for "converted" read -- converter --; line 48, for "aud" read -- and --; column 24, line 15, after "capacitor" insert a semi-colon; column 26, line 22, for "capacitors" read -- capacitor --; column 26, line 24, for "integral" read -- analog --; column 27, line 28, for "input" read -- output --; column 30, line 54, for the semi-colon read a colon; column 32, line 4, after "including", for the semi-colon read a colon.

Signed and sealed this 30th day of May 1961.

(SEAL)
Attest:

ERNEST W. SWIDER
Attesting Officer

DAVID L. LADD
Commissioner of Patents